United States Patent
Nohara et al.

(10) Patent No.: US 8,022,564 B2
(45) Date of Patent: Sep. 20, 2011

(54) SPEED REDUCER FOR USE IN YAW DRIVE APPARATUS FOR WIND POWER GENERATION APPARATUS, AND YAW DRIVE METHOD AND APPARATUS FOR WIND POWER GENERATION APPARATUS USING THE SPEED REDUCER

(75) Inventors: Osamu Nohara, Gifu (JP); Katsuhiko Yokoyama, Gifu (JP); Sadayuki Tanabe, Gifu (JP)

(73) Assignee: Nabtesco Corporation, Tokyo (JP)

( * ) Notice: Subject to any disclaimer, the term of this patent is extended or adjusted under 35 U.S.C. 154(b) by 0 days.

(21) Appl. No.: 12/484,340

(22) Filed: Jun. 15, 2009

(65) Prior Publication Data

US 2009/0243297 A1   Oct. 1, 2009

Related U.S. Application Data

(62) Division of application No. 10/567,613, filed as application No. PCT/JP2004/011786 on Aug. 11, 2004, now abandoned.

(30) Foreign Application Priority Data

| Aug. 12, 2003 | (JP) | 2003-292066 |
| Sep. 19, 2003 | (JP) | 2003-328965 |
| Sep. 19, 2003 | (JP) | 2003-329073 |
| Nov. 14, 2003 | (JP) | 2003-385529 |
| Nov. 17, 2003 | (JP) | 2003-386086 |

(51) Int. Cl.
*F03D 9/00*  (2006.01)
*H02P 9/04*  (2006.01)

(52) U.S. Cl. .......................................... 290/44; 290/55
(58) Field of Classification Search .................... 290/44, 290/55
See application file for complete search history.

(56) References Cited

U.S. PATENT DOCUMENTS

| 4,655,312 | A | * | 4/1987 | Frantom et al. ............. 180/268 |
| 4,692,094 | A | * | 9/1987 | Kulinyak ........................ 416/11 |
| 4,809,803 | A | * | 3/1989 | Ahern et al. ............. 180/65.245 |
| 5,119,121 | A | * | 6/1992 | Kobayashi et al. ............ 396/80 |
| 5,136,320 | A | * | 8/1992 | Kobayashi et al. ............ 396/86 |
| 5,146,259 | A | * | 9/1992 | Kobayashi et al. ............ 396/64 |
| 5,235,374 | A | * | 8/1993 | Kobayashi et al. ............ 396/80 |
| 5,241,334 | A | * | 8/1993 | Kobayashi et al. ............ 396/86 |
| 5,280,320 | A | * | 1/1994 | Kobayashi et al. ............ 396/85 |

(Continued)

FOREIGN PATENT DOCUMENTS

CN   1409029 A   4/2003

(Continued)

*Primary Examiner* — Pedro J Cuevas
(74) *Attorney, Agent, or Firm* — Panitch Schwarze Belisario & Nadel LLP

(57) ABSTRACT

A yaw drive method of a wind power generation apparatus, in which a second gear engaged with a first gear attached to one of tower or a wind power generation unit supported to the upper end of the tower so as to be capable of yawing and supported to a tower or to the upper end of the tower is rotated by a drive motor attached to the other of the tower or the wind power generation unit for yawing the wind power generation unit. A drive energy, which is supplied to the drive motor for a predetermined time from when the supply of the drive energy to the drive motor begins to start, is made to be smaller than the drive energy supplied to the drive motor in a common yawing.

4 Claims, 13 Drawing Sheets

U.S. PATENT DOCUMENTS

| | | | | |
|---|---|---|---|---|
| 5,291,232 | A * | 3/1994 | Kobayashi et al. | 396/87 |
| 5,363,164 | A * | 11/1994 | Kobayashi et al. | 396/77 |
| 5,384,617 | A * | 1/1995 | Kobayashi et al. | 396/165 |
| 5,651,747 | A | 7/1997 | Minegishi et al. | 475/176 |
| 5,695,425 | A | 12/1997 | Hashimoto et al. | 475/180 |
| 6,313,597 | B1 | 11/2001 | Elliott et al. | 318/701 |
| 6,888,262 | B2 * | 5/2005 | Blakemore | 290/44 |
| 7,004,724 | B2 * | 2/2006 | Pierce et al. | 416/61 |
| 7,075,192 | B2 | 7/2006 | Bywaters et al. | 290/55 |
| 7,095,129 | B2 * | 8/2006 | Moroz | 290/44 |
| 7,109,600 | B1 | 9/2006 | Bywaters et al. | 290/55 |
| 7,118,339 | B2 * | 10/2006 | Moroz et al. | 416/1 |
| 7,119,453 | B2 * | 10/2006 | Bywaters et al. | 290/55 |
| 7,121,795 | B2 * | 10/2006 | Moroz et al. | 416/1 |
| 7,126,236 | B2 * | 10/2006 | Harbourt et al. | 290/44 |
| 7,175,389 | B2 * | 2/2007 | Moroz | 416/1 |
| 7,183,665 | B2 * | 2/2007 | Bywaters et al. | 290/55 |
| 7,204,673 | B2 | 4/2007 | Wobben | 416/1 |
| 7,230,347 | B2 * | 6/2007 | Brown et al. | 290/55 |
| 7,235,895 | B2 * | 6/2007 | Melius et al. | 290/55 |
| 7,239,036 | B2 * | 7/2007 | D'Atre et al. | 290/44 |
| 7,248,006 | B2 * | 7/2007 | Bailey et al. | 318/400.4 |
| 7,550,863 | B2 | 6/2009 | Versteegh | 290/44 |
| 7,564,208 | B2 | 7/2009 | Bailey et al. | 318/567 |
| 7,642,748 | B2 * | 1/2010 | Glosser et al. | 320/116 |
| 7,717,673 | B2 * | 5/2010 | Menke | 416/1 |
| 7,719,128 | B2 * | 5/2010 | Kammer et al. | 290/44 |
| 7,736,125 | B2 * | 6/2010 | Bagepalli et al. | 415/126 |
| 7,740,448 | B2 * | 6/2010 | Meyer et al. | 416/1 |
| 7,898,140 | B2 * | 3/2011 | Nies | 310/231 |
| 7,922,449 | B2 * | 4/2011 | Scholte-Wassink | 416/1 |
| 2001/0044356 | A1 | 11/2001 | Takeuchi et al. | 475/178 |
| 2002/0158593 | A1 * | 10/2002 | Henderson et al. | 318/375 |
| 2003/0054912 | A1 | 3/2003 | Nohara et al. | 475/162 |
| 2004/0124796 | A1 * | 7/2004 | Bailey et al. | 318/254 |
| 2004/0151575 | A1 * | 8/2004 | Pierce et al. | 415/1 |
| 2005/0230979 | A1 * | 10/2005 | Bywaters et al. | 290/44 |
| 2006/0001268 | A1 * | 1/2006 | Moroz | 290/44 |
| 2006/0002791 | A1 * | 1/2006 | Moroz | 416/1 |
| 2006/0002792 | A1 * | 1/2006 | Moroz et al. | 416/1 |
| 2006/0002794 | A1 * | 1/2006 | Moroz et al. | 416/48 |
| 2006/0002797 | A1 * | 1/2006 | Moroz et al. | 416/98 |
| 2006/0152015 | A1 * | 7/2006 | Bywaters et al. | 290/55 |
| 2006/0208493 | A1 * | 9/2006 | Harbourt et al. | 290/44 |
| 2007/0024059 | A1 * | 2/2007 | D'Atre et al. | 290/44 |
| 2007/0057516 | A1 * | 3/2007 | Mever et al. | 290/44 |
| 2007/0075548 | A1 * | 4/2007 | Bagepalli et al. | 290/55 |
| 2007/0085345 | A1 * | 4/2007 | Brown et al. | 290/44 |
| 2007/0085346 | A1 * | 4/2007 | Melius et al. | 290/55 |
| 2007/0090797 | A1 * | 4/2007 | Glosser et al. | 320/116 |
| 2008/0067965 | A1 * | 3/2008 | Bailey et al. | 318/561 |
| 2008/0150292 | A1 * | 6/2008 | Fedor et al. | 290/55 |
| 2008/0166231 | A1 * | 7/2008 | Bagepalli | 415/215.1 |
| 2008/0272604 | A1 * | 11/2008 | Versteegh | 290/55 |
| 2009/0148286 | A1 * | 6/2009 | Kammer et al. | 416/31 |
| 2009/0153656 | A1 * | 6/2009 | Sharonova | 348/125 |
| 2009/0220343 | A1 * | 9/2009 | DiMascio et al. | 416/161 |
| 2009/0243295 | A1 * | 10/2009 | Kammer et al. | 290/44 |
| 2009/0299697 | A1 * | 12/2009 | Hamby et al. | 702/182 |
| 2010/0066087 | A1 * | 3/2010 | Hayashi et al. | 290/44 |
| 2010/0078939 | A1 * | 4/2010 | Kammer et al. | 290/44 |
| 2010/0109327 | A1 * | 5/2010 | Nielsen et al. | 290/44 |
| 2010/0111665 | A1 * | 5/2010 | Daniels | 414/814 |
| 2010/0119370 | A1 * | 5/2010 | Myhr | 416/39 |
| 2010/0140948 | A1 * | 6/2010 | Segovia et al. | 290/55 |
| 2010/0144483 | A1 * | 6/2010 | Aiyakkannu | 475/225 |
| 2010/0296932 | A1 * | 11/2010 | Yoshida | 416/147 |
| 2011/0012360 | A1 * | 1/2011 | Numajiri | 290/55 |

FOREIGN PATENT DOCUMENTS

| | | |
|---|---|---|
| JP | 56-029074 A | 3/1981 |
| JP | 59-168281 A | 9/1984 |
| JP | 61-055369 A | 3/1986 |
| JP | 63-071440 A | 3/1988 |
| JP | 64-077761 A | 3/1989 |
| JP | 06-351273 A | 12/1994 |
| JP | 11-215880 A | 8/1999 |
| JP | 2000-033061 A | 2/2000 |
| JP | 2000-358399 A | 12/2000 |
| JP | 2001289149 A | 10/2001 |
| JP | 2002-021947 A | 1/2002 |
| JP | 2002106650 A | 4/2002 |
| JP | 2002-530590 A | 9/2002 |
| JP | 2003-083400 A | 3/2003 |
| WO | 02/42641 A1 | 5/2002 |

* cited by examiner

FIG. 12(a) ROTATIONAL SPEED OF OUTPUT SHAFT
FIG. 12(b) PRESSURE IN BRAKING CHAMBER
FIG. 12(c) MOTOR VOLTAGE
FIG. 12(d) SENSOR SIGNAL

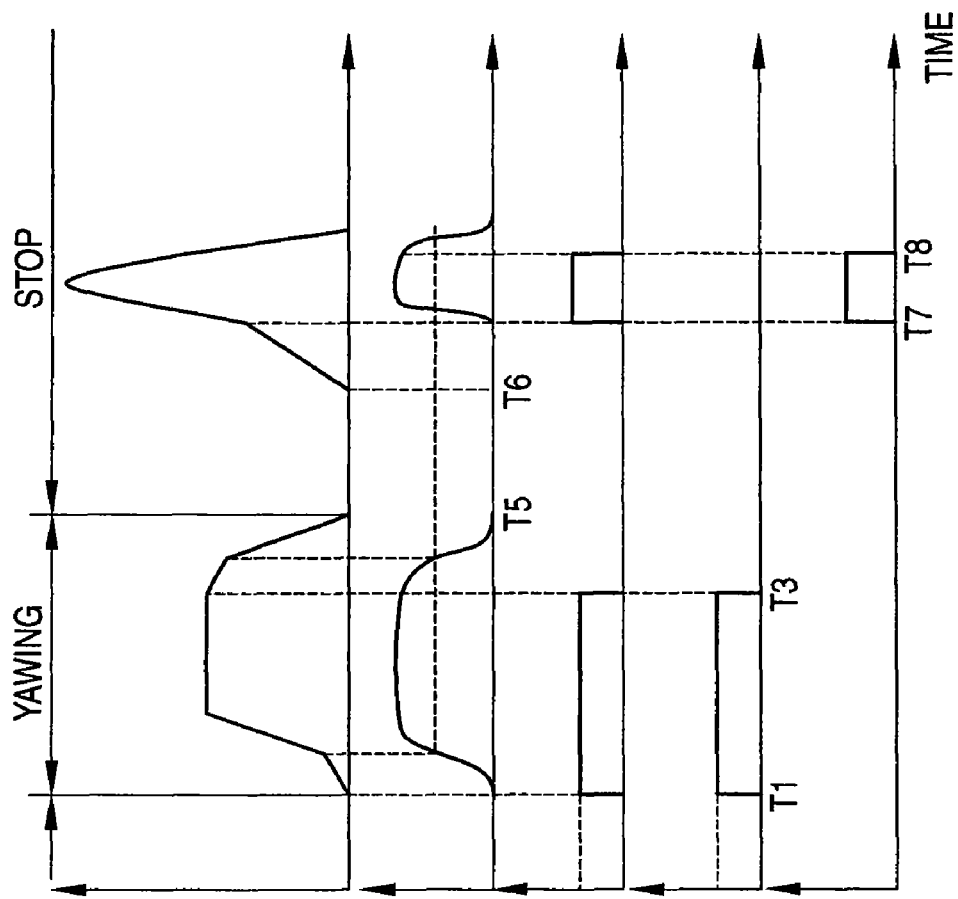

SPEED REDUCER FOR USE IN YAW DRIVE APPARATUS FOR WIND POWER GENERATION APPARATUS, AND YAW DRIVE METHOD AND APPARATUS FOR WIND POWER GENERATION APPARATUS USING THE SPEED REDUCER

CROSS-REFERENCE TO RELATED APPLICATIONS

This application is a Divisional of U.S. patent application Ser. No. 10/567,613, filed Feb. 8, 2006, which is a Section 371 of International Application No. PCT/JP2004/011786, filed Aug. 11, 2004, which was published in Japanese language on Feb. 14, 2005, under International Publication No. WO 2005/015011 A1, the disclosure of which is incorporated herein by reference.

BACKGROUND OF THE INVENTION

The present invention relates to a speed reducer for use in a yaw drive apparatus which rotates a wind power generation unit of a wind power generation apparatus in a substantially horizontal plane, and a yaw drive method and an apparatus for wind power generation apparatus using the speed reducer.

In general, the yaw drive apparatus of the wind power generation apparatus rotates a windmill power generation unit about a tower according to a wind in order that blades of the wind power generation apparatus can receive the wind, and rotates a ring gear provided at the tower.

The yaw drive apparatus is generally constructed by a general-purpose induction motor (the number of rotations is 1000 to 1800 rpm) and a plurality of reducing mechanism (the total reduction gear ratio is 1/1000 to 1/3000).

Most conventional speed reducers for use in the yaw drive apparatus of the windmill power generation apparatus use a speed reducer including five stage-planetary speed reduction mechanisms, for obtaining the high gear reduction ratio. The planetary speed reduction mechanism includes an input sun gear, a plurality of planetary gears engaged with the input sun gear at the periphery of the input sun gear, an internal gear member having internal teeth engaged with the plurality of the planetary gears at the periphery of the plurality of the planetary gears, and a carrier rotatably supporting the plurality of planetary gears. The total reduction gear ratio is about 77% (95%×95%×95%×95%×95% at each stage=about 77%).

The applicant of the present invention has proposed to construct the speed reducer as three stage speed reduction mechanism constituted by a first speed reducing portion, a second speed reducing portion connected to the first speed reducing portion, and an eccentric oscillating-type speed reduction mechanism connected to the second speed reducing portion (refer to JP-A-2003-83400).

Further, an example of the conventional yaw drive method and apparatus of the wind power generation apparatus having the construction to be described is disclosed in JP-A-2001-289149.

The above-described yaw drive apparatus including a first gear connected to the upper end of the tower, a second gear engaged with the first gear, a motor which is attached to the wind power generation unit capable of yawing, supported at the upper end of the tower and drivingly rotates the second gear for yawing the wind power generation unit, a hydraulic brake including an electromagnetic brake attached to the motor and using a friction plate, a brake disk fixed to the upper end of the tower, and a frictional-fixing type brake shoe which is provided to the wind power generation unit and interposes the brake disk in it using the hydraulic driving.

When the wind power generation unit is yawed by the motor, the electromagnetic brake and the hydraulic brake are turned into a non-braking state simultaneously with the start-up of the electrification to the motor, so that the motor and the wind power generation unit is released from the braking. On the other hand, when the yawing of the wind power generation unit is stopped, the electromagnetic brake and the hydraulic brake are turned into the braking state simultaneously with the stoppage of the electrification to the motor, so that the motor and the wind power generation unit are provided with the braking torque.

However, the maintenance of the former speed reducer including five stage-planetary speed reduction mechanisms was not good due to the long total length and the large capacity. Further, when the speed reducer is operated at a low temperature of −20° C. or less, the stirring resistance of a lubricant becomes large due to the five stage reduction, and a motor with a large output is needed for compensating the loss of the stirring resistance.

In the latter speed reducer including the three stage speed reducing portions, the optimum reduction gear ratio for obtaining high efficiency for yaw drive apparatus was not proposed.

BRIEF SUMMARY OF THE INVENTION

In consideration of the above-described situation, it is an object of the present invention to provide a speed reducer which is provided with an optimum speed distribution for a yaw drive apparatus, has high efficiency and a short axial length, and is suitable for the yaw drive apparatus. Further, it is another object of the present invention to provide a yaw drive apparatus of a wind power generation apparatus which is highly efficient and is compact in size.

Further, in the conventional yaw drive method and apparatus of the wind power generation apparatus, since the braking against the motor is terminated when the electrification to the motor begins to start, the rotational drive torque of the motor is transferred to the second gear as it is, so that it rotates rapidly the second gear. However, since the wind power generation unit has a large inertial mass, it cannot rotate by following the second gear. As a result, the teeth of the second gear cause a significant impact on the first gear. Therefore, the teeth of the first and second gear may be damaged at the start-up of the yawing of the wind power generation unit, or a loud noise occurs. Further, considering the structural features, the strength of the first and second gears needs to be increased for the impact resistance, so that the apparatus becomes expensive and large in size.

On the other hand, when the electrification to the motor is stopped, since the electro-magnetic brake starts applying the braking torque to the motor, therefore, the rotation of the second gear is rapidly stopped. However, since the wind power generation unit is apt to rotate continuously at the same rotational speed, the teeth of the first gear cause a significant impact on the teeth of the second gear. Therefore, the teeth of the first and second gear may be damaged even when the yawing of the wind power generation unit is stopped, or a loud noise occurs. Further, the strength of the first and second gears needs to be increased for the impact resistance as described above, thus the apparatus becomes expensive and large in size.

Therefore, it is an object of the present invention to provide a yaw drive method and apparatus of the wind power generation apparatus in which the impact at the start-up of the supply of the drive energy to the drive motor is suppressed, whereby the damage on the teeth and the noise are reduced, at the same time, the size is reduced at a low cost.

The present invention provides a reducer constituted by a first stage speed reducing portion, a second stage speed reducing portion connected to the first speed reducing portion, and a third stage speed reducing portion. Further, the total reduction gear ratio of a first stage speed reducing portion and a second speed reducing portion is set to 1/6 to 1/60. Further, the third stage speed reducing portion is constructed by an eccentric oscillating type speed reduction mechanism including an internal gear member in which internal teeth are formed at the internal periphery thereof, a plurality of external gears which are received in the internal gear member, which have external teeth engaged with the internal teeth and having number of teeth slightly less than that of the internal teeth at the external periphery thereof, and which is disposed in parallel to each other in the axial direction, a plurality of crank shafts which are rotatably inserted into the plurality of external gears, and which are connected to the second stage speed reducer and rotates to eccentrically rotate the plurality of external gears, and a carrier which rotatably supports both ends of the crank shafts. Further, a reduction gear ratio of the eccentric oscillating-type speed reduction mechanism is set to 1/50 to 1/140, and the total reduction gear ratio of the speed reducer is set to 1/1000 to 1/3000. Therefore, it is possible to provide the speed reducer which is suitable for the yaw drive apparatus of the wind power generation apparatus, and has high efficiency and a short axial length.

Further, the first stage speed reducing portion of the speed reducer is constructed by a planetary speed reduction mechanism including an input sun gear, a plurality of planetary gears engaged with the input sun gear at the periphery of the input sun gear, an internal gear member having internal teeth engaged with the plurality of the planetary gears at the periphery of the plurality of the planetary gears, and a carrier rotatably supporting the plurality of planetary gears. Further, the second stage speed reducing portion of the speed reducer is constructed by a spur gear type speed reduction mechanism including an input spur gear connected to the carrier of the planetary speed reduction mechanism, and a spur gear engaged with the input spur gear. Therefore, it is possible to provide the speed reducer which is suitable for the yaw drive apparatus of the wind power generation apparatus, and has high efficiency and a short axial length.

Further, the first stage speed reducing portion of the speed reducer is constructed by a spur gear type speed reduction mechanism including a first input spur gear, and a first spur gear engaged with the first input spur gear, and the second stage speed reducing portion of the speed reducer is constructed by spur gear type speed reduction mechanism including a second input spur gear connected to the first spur gear, and a second spur gears engaged with the second input spur gear. Therefore, it is possible to provide the speed reducer which is suitable for the yaw drive apparatus of the wind power generation apparatus, and has high efficiency and a short axial length.

Further, the yaw drive apparatus of the wind power generation apparatus according to the present invention uses the above-described highly efficient speed reducer. An output shaft of a motor is connected to an input part of a first stage speed reducing portion, and an output part of an eccentric oscillating-type speed reduction mechanism is provided with external teeth engaged with a ring gear of a tower. Therefore, it is possible to provide the yaw drive apparatus of the wind power generation apparatus, which is highly efficient and is small in size.

Further, there is provided a yaw drive method of a wind power generation apparatus, in which a second gear engaged with a first gear attached to one of a tower or a wind power generation unit supported to the upper end of the tower so as to be capable of yawing is rotated by a drive motor attached to the other of the tower or the wind power generation unit for yawing the wind power generation unit. A drive energy, which is supplied to the drive motor for a predetermined time from when the supply of the drive energy to the drive motor begins to start, is made to be smaller than the drive energy supplied to the drive motor in a common yawing.

Further, there is provided a yaw drive apparatus of a wind power generation apparatus. The yaw drive apparatus includes a first gear attached to one of a tower or a wind power generation unit supported to the upper end of the tower so as to be capable of yawing, a second gear engaged with the first gear, a drive motor attached to the other of the tower or the wind power generation unit, and rotates the second gear when the drive energy is supplied, thereby yawing the wind power generation unit. The reduction means makes a drive energy, which is supplied to the drive motor for a predetermined time from when the supply of the drive energy to the drive motor begins to start, smaller than the drive energy supplied to the drive motor in a common yawing.

Further, there is provided a yaw drive method of a wind power generation apparatus, in which a pinion, which is engaged with a ring-shaped internal gear attached to one of a tower or a wind power generation unit supported to the upper end of the towe so as to be capable of yawing, is rotated by a drive motor attached to the other of the tower or the wind power generation unit for yawing the wind power generation unit. A drive energy, which is supplied to the drive motor for a predetermined time from when the supply of the drive energy to the drive motor begins to start, is made smaller than the drive energy supplied to the drive motor in a common yawing.

Further, there is provided a yaw drive apparatus of a wind power generation unit. The yaw drive apparatus includes a ring-shaped internal gear attached to one of tower or a wind power generation unit supported to the upper end of the tower so as to be capable of yawing and supported to a tower or to the upper end of the tower, a pinion engaged with the internal gear, a drive motor attached the other of the tower or the wind power generation unit, and rotates the pinion when the drive energy is supplied, thereby yawing the wind power generation unit, and a reduction means that reduces a drive energy, which is supplied to the drive motor for a predetermined time from when the supply of the drive energy to the drive motor begins to start, is smaller than the drive energy supplied to the drive motor in a common yawing.

According to the present invention, it is possible to provide a speed reducer which has high efficiency and a short axial length, and is suitable for the yaw drive apparatus. Further, it is possible to provide a yaw drive apparatus of a wind power generation apparatus which is highly efficient and is compact in size.

Further, when the wind power generation unit is yawed by a drive motor, the drive energy is supplied to the drive motor. At this time, since the drive energy, which is supplied to the drive motor from when the supply of the drive energy to the drive motor begins to start, is made to be smaller than the drive energy supplied to the drive motor in a common yawing by the reduction means, the rotational drive torque applied to the second gear from the drive motor at the start-up of the rotation has an energy corresponding to the small drive energy. As a result, the impact between the teeth of the first gear and the second gear is reduced at the time of the start-up of the rotation of the second gear, whereby it is possible to reduce the damage on the teeth of the first and second gears and noise, and to make the apparatus small in size at a low price. At this state, after a predetermined time, the rotational speed of the drive motor increases to some degree. After that, however, the drive motor is provided with the drive energy in common yawing and the yawing of the wind power generation unit is performed.

Further, when the yawing of the wind generation unit is stopped, the drive energy, which is supplied to the drive motor for a predetermined period just before the supply of the drive energy to the drive motor is stopped to the point of time at which the supply of the drive energy is stopped, is made smaller than the drive energy supplied to the drive motor in a common yawing, and the rotary power applied to the wind power generation unit from the drive motor for the above-described period is made small, the rotational speed of the wind power generation unit decreases gradually due to the frictional resistance or gyroscopic effect of the rotor-head or the like for the above-described period. In this way, in cases where the rotational speed decrease, and a predetermined value of braking torque is applied by the braking means after the supply of the drive energy to the drive motor is stopped, the impact between the teeth of the first gear and the teeth of the second gear is reduced, whereby it is possible to reduce the damage on the teeth of the first and second gear and noise, and to make the apparatus small in size at a low price.

Further, when the yawing of the wind power generation unit is stopped, the supply of the drive energy to the drive motor is stopped. However, since a predetermined value of braking torque is applied to the drive motor by the braking means after a predetermined time from when the supply of the drive energy to the drive motor is stopped, the rotational speed of the wind power generation unit gradually decreases due to the frictional resistance or gyroscopic effect of the rotor-head or the like for a predetermined time from when the supply of the drive energy is stopped. Further, since the above-described braking torque is applied to the drive motor from the braking means when the rotational speed decreases in this way, the impact between the teeth of the first gear and the teeth of the second gear is reduced, whereby it is possible to reduce the damage on the teeth of the first and second gear and noise, and to make the apparatus small in size at a low price.

Further, since it is possible to remove the backlash between the teeth of the first gear and the teeth of the second gear, the impact between the teeth of the first gear and the teeth of the second gear can be reduced more effectively.

Further, during the stoppage of the driving of the fluid motor, an excessive wind load of a gust or the like acts on the wind power generation unit, so that the wind power generation unit rotates, whereby the fluid motor may perform a pump operation. However, according to an aspect of the invention, it is possible to prevent the fluid motor and the wind power generation unit from being rotated at a high speed.

Further, the fluid motor may perform the pump operation due to the above-described reason. However, at this time, the fluid braking force is applied to the fluid motor by back pressure, so that the rotation of the fluid motor can be restricted, whereby it is possible to omit a hydraulic pressure brake constituted by a brake disk fixed to the upper end of the tower and frictional fixing type brake shoe in which the brake disk is interposed, which is necessary to fix the conventional wind power generation unit.

For this reason, the drive motor rotate while receiving the braking force from the brake means and may adversely affect to the apparatus, but this case can be prevented.

Further, when the wind power generation unit is yawed by the drive motor, the drive energy is supplied to the motor. However, since the start-up braking torque is applied to the drive motor by the braking means from when the supply of the drive energy to the drive motor begins to start, the rotational drive torque obtained by subtracting the start-up braking torque from the output drive torque of the drive motor is applied to the second gear at a reduced state. Here, since the start-up braking torque has a predetermined value lower than the maximum drive torque of the drive motor, the second gear can rotate for yawing the wind power generation unit. However, since the rotational drive torque at this time has a small value obtained from the above-described subtraction, and the rotational speed of the second gear is reduced by the start-up braking torque, an impact between the teeth of the first gear and the teeth of the second gear is reduced, whereby it is possible to reduce the damage on the teeth of the first and second gears or noise, and to make the apparatus small in size at a low price. After a short predetermined time passes from this state, the rotational speed of the drive motor increases to some degree. However, at this point of time, the application of the start-up braking torque is terminated and the yawing of the wind power generation unit is performed.

Further, when the yawing of the wind power generation unit is stopped, the supply of the drive energy to the drive motor is stopped. However, since a predetermined value of the final braking torque is applied to the drive motor by the braking means after the passage of a predetermined time from when the supply of the drive energy to the drive motor is stopped, the rotational speed of the wind power generation unit decreases gradually due to the frictional resistance or gyroscopic effect of the rotor-head or the like for a predetermined time from when the supply of the drive energy is stopped. Further, since the above-described final braking torque is applied to the drive motor from the braking means at the point of time at which the rotational speed decreases in this way, the impact between the teeth of the first gear and the teeth of the second gear is reduced, whereby it is possible to reduce the damage on the teeth of the first and second gear and noise, and to make the apparatus small in size at a low price.

When the yawing of the wind generation unit is stopped, the drive energy, which is supplied to the drive motor for a predetermined period just before a point of time at which the supply of the drive energy to the drive motor is stopped to the point of time at which the supply of the drive energy is stopped, is made smaller than the drive energy supplied to the drive motor in a common yawing, and the rotary power applied to the wind power generation unit from the drive motor for the above-described period is made small, the rotational speed of the wind power generation unit gradually decreases due to the frictional resistance or gyroscopic effect of the rotor-head or the like for the above-described period. In this way, when the rotational speed decrease and a predetermined value of final braking torque is applied by the braking means after the supply of the drive energy to the drive motor is stopped, the impact between the teeth of the first gear and the teeth of the second gear is reduced, whereby it is possible to reduce the damage on the teeth of the first and second gear and noise, and to make the apparatus small in size at a low price.

The same braking means may be provided with both the impact reduction function and the rotation restriction function of the wind power generation unit at the time of the stoppage of the motor, whereby the structure become simple and the manufacturing cost becomes inexpensive compared to the case in which the two braking means are provided according to their functions.

Additionally, the structure of the braking member is simple, thus it can be provided at a low cost.

Further, it is possible to securely isolate a rotational side frictional member and a fixed side frictional member with a simple construction.

Further, during the rotation of the wind power generation unit is stopped, when the wind power generation unit rotates due to the excessive wind load caused by a gust or the like, this rotation is transferred to the braking means, and a rotational side frictional member rotates as it is while being frictionally contacted with a fixed side frictional member, the braking means may be heated by the frictional heat and damaged. However, it is possible to prevent this accident by a construction in accordance with an aspect of the invention.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings:

FIG. 14 is a graph illustrating an operation timing of the seventh embodiment of the invention, in which (a) illustrates the relationship between time and the rotational speed of the output shaft, (b) illustrates the relationship between time and the pressure in the breaking chamber, (c) illustrates a relationship between time and the switching valve voltage, (d) illustrates the relationship between time and the motor voltage, and (e) illustrates the relationship between time and the sensor signal.

DETAILED DESCRIPTION OF THE INVENTION

Example 1

Figure 1:
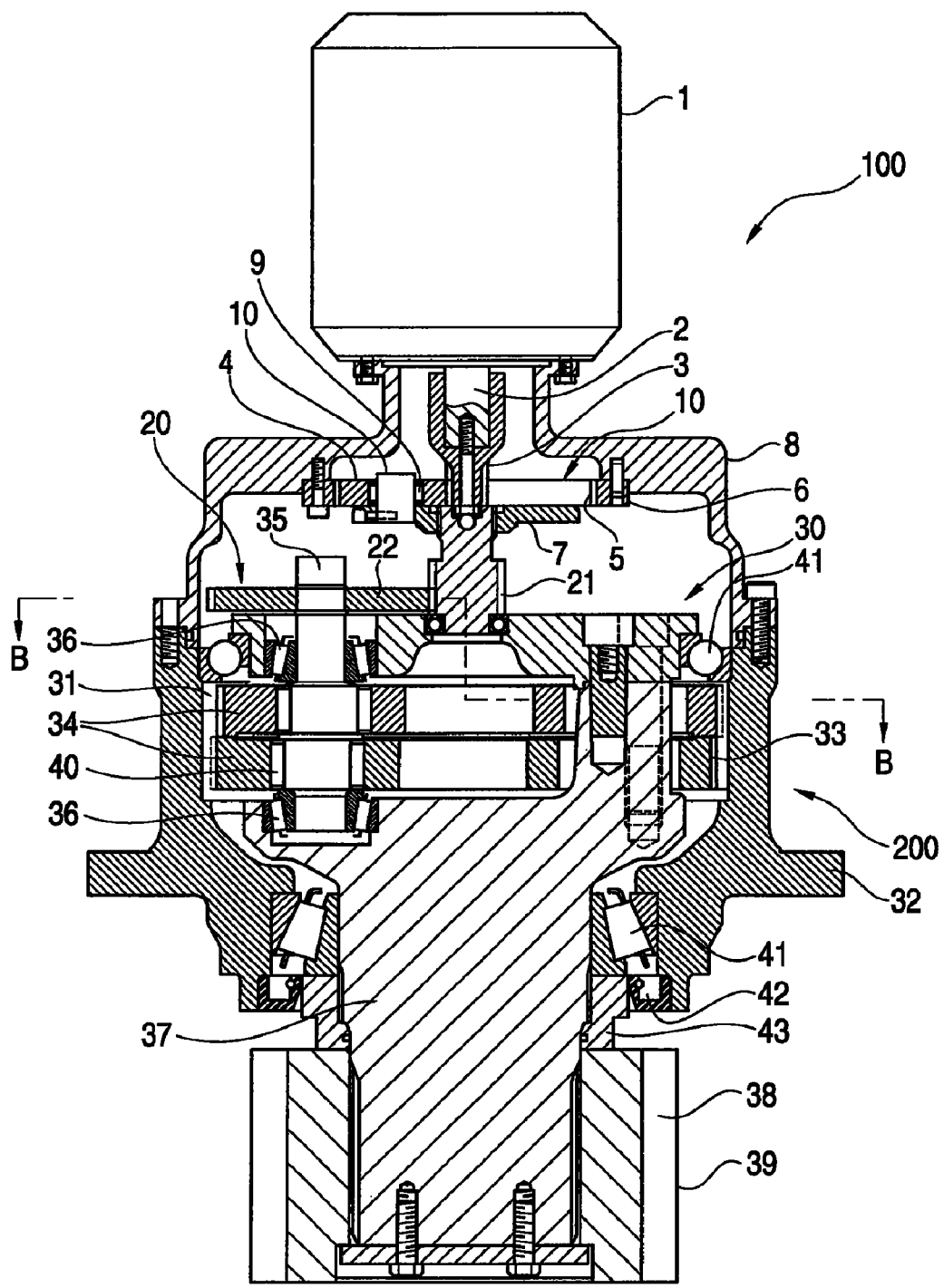
FIG. 1 is a view illustrating a first embodiment of the invention.
Figure 2:
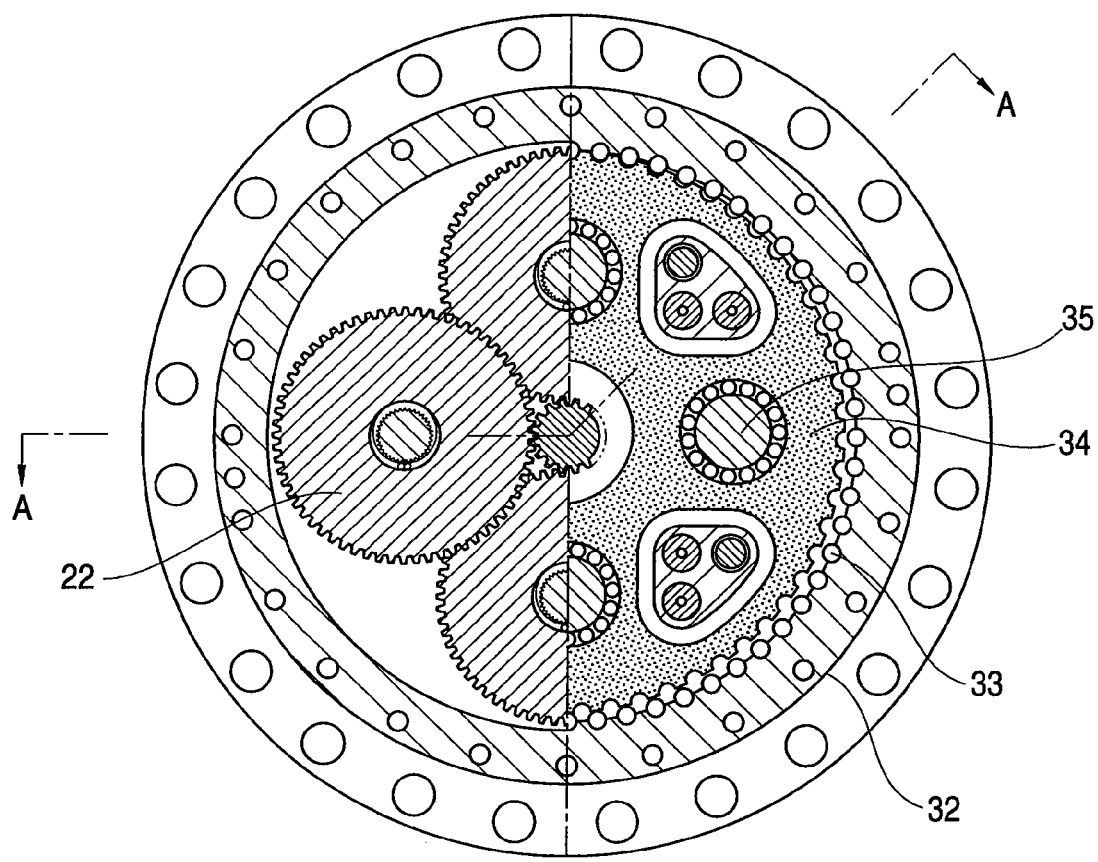
FIG. 2 is a cross-sectional view taken along the line B-B of FIG. 1.

Hereinafter, a first embodiment of the present invention will be described with reference to FIGS. 1 and 2. FIG. 1 is a longitudinal cross-sectional view seen from the A-A direction of FIG. 2. FIG. 2 is a cross-sectional view taken along the line A-A of FIG. 1.

A reference numeral 100 indicates a yaw drive apparatus of a wind power generation apparatus. A reference numeral 200 indicates a speed reducer used in the yaw drive apparatus 100. The speed reducer 200 is constituted by a first stage speed reducing portion 10, a second stage speed reducing portion 20 connected to the first speed reducing portion 10, and a third stage speed reducing portion 30.

The first stage speed reducing portion 10 is constructed by a planetary speed reduction mechanism comprising an input sun gear 3 as an input part, which is fixedly connected to an output shaft 2 of a motor 1, a plurality of (three) planetary gears 4 engaged with the input sun gear 3 at the periphery of the input sun gear 3, an internal gear member 6 having internal teeth 5 engaged with the plurality of the planetary gears 4 at the periphery of the plurality of the planetary gears 4, and a carrier 7 rotatably supporting the plurality of planetary gears 4. The motor 1 is attached to a supporting member 8 of the motor. The internal gear member 6 is fixed to the supporting member 8 of the motor at the inside thereof. A plurality of pins 10 rotatably supporting the planetary gear 4 through a plurality of needles is fixed to the carrier 7.

In the first stage speed reducing portion 10 constructed by the planetary speed reduction mechanism, the reduction gear ratio is selectively set to 1/3 to 1/20.

The second stage speed reducing portion 20 is constructed by a spur gear type speed reduction mechanism constituted by an input spur gear 21 connected to the carrier 7, and a plurality of (four) spur gears 22 engaged with the input spur gear 21.

In the second stage speed reducing portion 20 constructed by the spur gear type speed reduction mechanism, the reduction gear ratio is set to 1/3. The second speed reducing portion 20 may be selectively set to 1/2 to 1/5.

Therefore, a total reduction gear ratio of the first and second speed reducing portions 10 and 20 is set to 1/27 (1/9×1/3). The total reduction gear ratio of the first and second speed reducing portions 10 and 20 may be set to 1/6 to 1/100(1/3× 1/2 to 1/20×1/5). However, in the speed reducer of the invention used in the yaw drive apparatus, it is preferable that the total reduction gear ratio of the first and second speed reducing portions is set to 1/6 to 1/60.

The third stage speed reducing portion 30 is constructed by an eccentric oscillating type speed reduction mechanism including a fixed internal gear member 32 in which internal teeth 31 are formed at the internal periphery thereof, a plurality of (two) external gears 34, which are received in the internal gear member 32, which have external teeth 33 engaged with the internal teeth 31 and having number of teeth slightly less than that of the internal teeth 31 at the external periphery thereof, and which are disposed in parallel to each other in the axial direction, a plurality of (four) crank shafts 35, which are rotatably inserted into the plurality of external gears 34, and which are connected to the spur gear 22 of the second stage speed reducer 20 and rotate to eccentrically rotate the plurality of external gears 34, and a carrier 37 as an output part, which rotatably supports both ends of the crank shafts 35 through a pair of bearings 36. A pinion gear 39 having external teeth 38 engaged with a ring gear of a tower (not shown) is provided at a leading end of the carrier 37 through a spline connection. The pinion 39 may be formed at the leading end of the carrier 37 through a machining. Each of the plurality of spur gears 22 of the second stage speed reducing portion 20 is attached to each end of the plurality of crank shafts 35. Each of crank portions of the plurality of crank shafts 35 is inserted into the inside of the plurality of external gears 34 through a needle bearing 40. The carrier 37 is rotatably supported by the internal gear member 32 through a pair of bearings 41. An oil-seal 42 is inserted between the internal periphery of the leading end of the internal gear member 32 and a supporting member 43 of the oil seal 42, which is attached to the periphery of the carrier 37. The one end of the supporting member 8 of the motor is fixed to the end of the internal gear member 32.

The reduction gear ratio of the third stage speed reducing portion 30 constructed by the eccentric oscillating type speed reduction mechanism is selectively set to 1/50 to 1/140.

The total reduction gear ratio of the speed reducer of the present invention, which is constructed by three stage speed reduction, is set to 1/1620(1/9×1/3×1/60). The total reduction gear ratio of the speed reducer constructed by three stage speed reduction may be set to 1/300 to 1/14000(1/3×1/2×1/50 to 1/20×1/5×1/140). However, in the speed reducer according to the invention, used in the yaw drive apparatus, it is preferable that the total reduction gear ratio is set to 1/1000 to 1/3000.

Example 2

Next, a second embodiment of the invention will be described with reference to a longitudinal cross-sectional view shown in FIG. 3.

Figure 3:
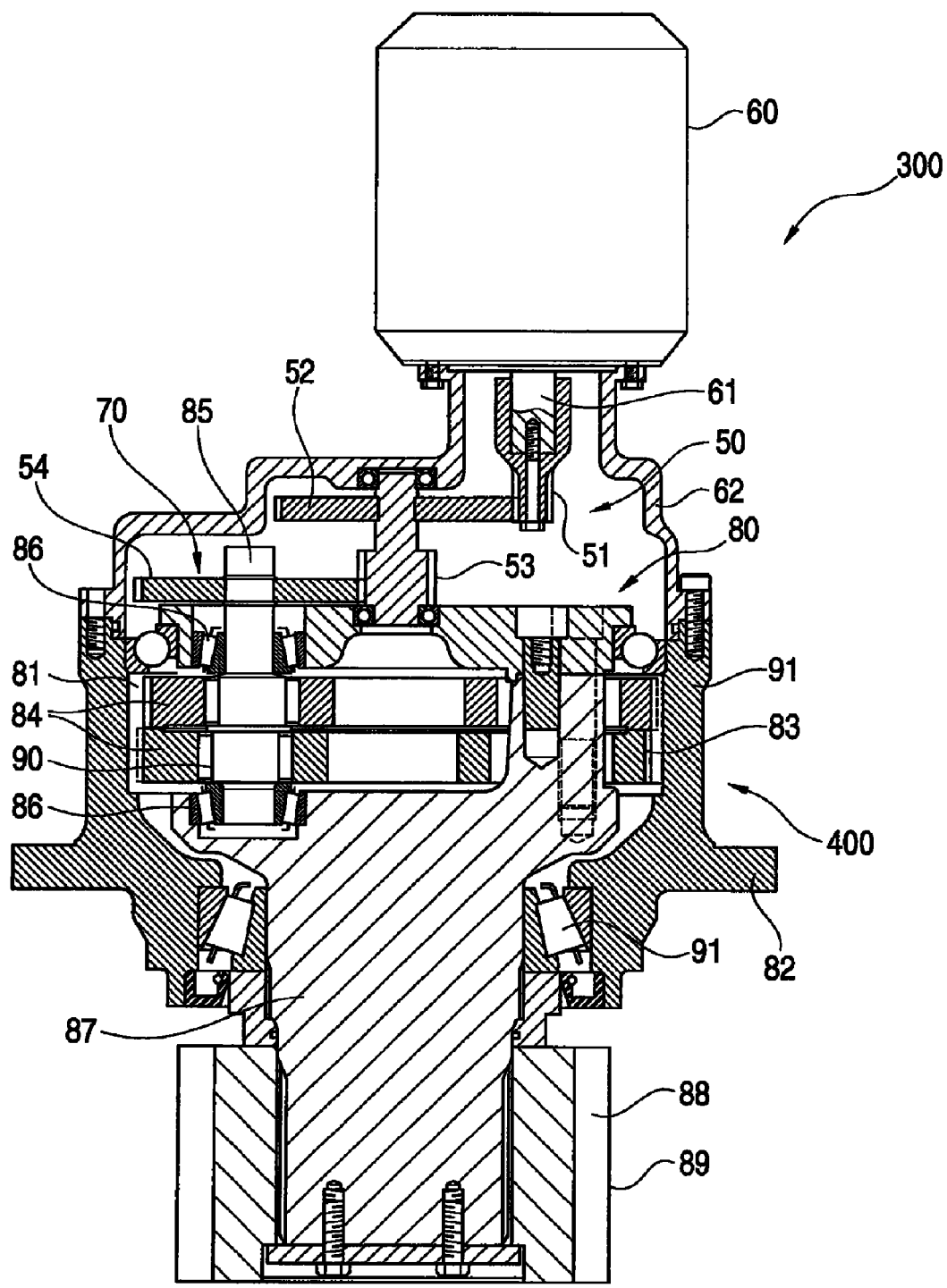
FIG. 3 is a view illustrating a second embodiment of the invention.

In FIG. 3, a reference numeral 300 indicates a yaw drive apparatus of a wind power generating apparatus. A reference numeral 400 indicates a speed reducer used in the yaw drive apparatus 300.

A first stage speed reducing portion 50 is constructed by a spur gear type speed reduction mechanism constituted by a first input spur gear 51 as an input part, which is fixedly connected to the output shaft 61 of the motor 60, and a first spur gear 52 engaged with the first input spur gear 51.

The reduction gear ratio of the first speed reducing portion 50 constructed by the spur gear type speed reduction mechanism is set to 1/6. The reduction gear ratio of the first stage speed reducing portion 50 is selectively selected from 1/2 to 1/12. A motor 60 is attached to the supporting member 62 of the motor.

A second stage speed reducing portion 70 is constructed by the spur gear type speed reduction mechanism constituted by a second input spur gear 53 connected to the first spur gear 52, and a plurality of (four) second spur gears 54 engaged with the second input spur gear 53. The second spur gear 53 is rotatably supported by a supporting member 62 of the motor and a carrier 87 of the eccentric oscillating type speed reduction mechanism to be described later.

The reduction gear ratio of the second stage speed reducing portion constructed by the spur gear type speed reduction mechanism is set to 1/3. The reduction gear ratio of the second stage speed reducing portion is selectively set to 1/2 to 1/5.

Therefore, a total reduction gear ratio of the first and second speed reducing portions 50 and 70 is set to 1/18 (1/6×1/3). The total reduction gear ratio of the first and second speed reducing portions 50 and 70 may be set to 1/4 to 1/60(1/2×1/2 to 1/12×1/5). However, in the speed reducer of the invention used in the yaw drive apparatus, it is preferable that the total reduction gear ratio of the first and second speed reducing portions is set to 1/6 to 1/60.

The third stage speed reducing portion 80 is constructed by an eccentric oscillating type speed reduction mechanism constituted by a fixed internal gear member 82 in which internal teeth 31 are formed at the internal periphery thereof, a plurality of (two) external gears 84, which are received in the internal gear member 82, which have external teeth 83 engaged with the internal teeth 81 and having number of teeth slightly less than that of the internal teeth 81 at the external periphery thereof, and which are disposed in parallel to each other in the axial direction, a plurality of (four) crank shafts 85, which are rotatably inserted into the plurality of external gears 84, and which are connected to the second spur gear 54 of the second stage speed reducer 70 and rotate to eccentrically rotate the plurality of external gears 84, and a carrier 87 as an output part, which rotatably supports both ends of the crank shafts 85 through a pair of bearings 86. A pinion gear 89 having external teeth 88 engaged with a ring gear of a tower (not shown) is provided at a leading end of the carrier 87 through spline connection. Each of the plurality of the second spur gears 54 of the second stage speed reducing portion 70 is attached to each end of the plurality of crank shafts 85. Each of crank portions of the plurality of crank shafts 85 is inserted into the inside of the plurality of external gears 84 through a needle bearing 90. The carrier 87 is rotatably supported by the internal gear member 82 through a pair of bearings 91.

An end of the supporting member 62 of the motor is fixed to the end of the internal gear member 82. The reduction gear ratio of he third stage speed reducing portion 80 constructed by the eccentric oscillating type speed reduction mechanism is set to 1/60. The reduction gear ratio of the third stage speed reducing portion 30 constructed by the eccentric oscillating type speed reduction mechanism is selectively set to 1/50 to 1/140. The total reduction gear ratio of the speed reducer of the invention, which is constructed by three stage speed reduction, is set to 1/1080(1/6×1/3×1/60). The total reduction gear ratio of the speed reducer constructed by three stage speed reduction may be set to 1/200 to 1/8400(1/2×1/2×1/50 to 1/12×1/5×1/140). However, in the speed reducer according to the invention, used in the yaw drive apparatus, it is preferable that the total reduction gear ratio is set to 1/1000 to 1/3000.

Next, the operation of the present invention will be described.

The rotation of the output shafts 2 and 61 of the motors 1 and 60 is reduced firstly at the first stage speed reducing portions 10 and 50, secondly at the second speed reducing portions 20 and 70, and finally at the third speed reducing portions 30 and 80. Therefore, in the speed reducer constituted by the carriers 37 and 87, and three speed-reducing portions, for obtaining the total reduction gear ratio of about 77% equal to that of the conventional speed reducer constructed by connecting planetary speed reduction mechanisms in five stages, it needs to set the reduction gear ratio of the third speed reducing portion 30 constructed by the eccentric oscillating type speed reduction mechanism according to the first embodiment at about 85% (77%÷95% at the first stage planetary speed reduction mechanism÷96% at the second spur gear type speed reduction mechanism=about 85%).

Figure 4:
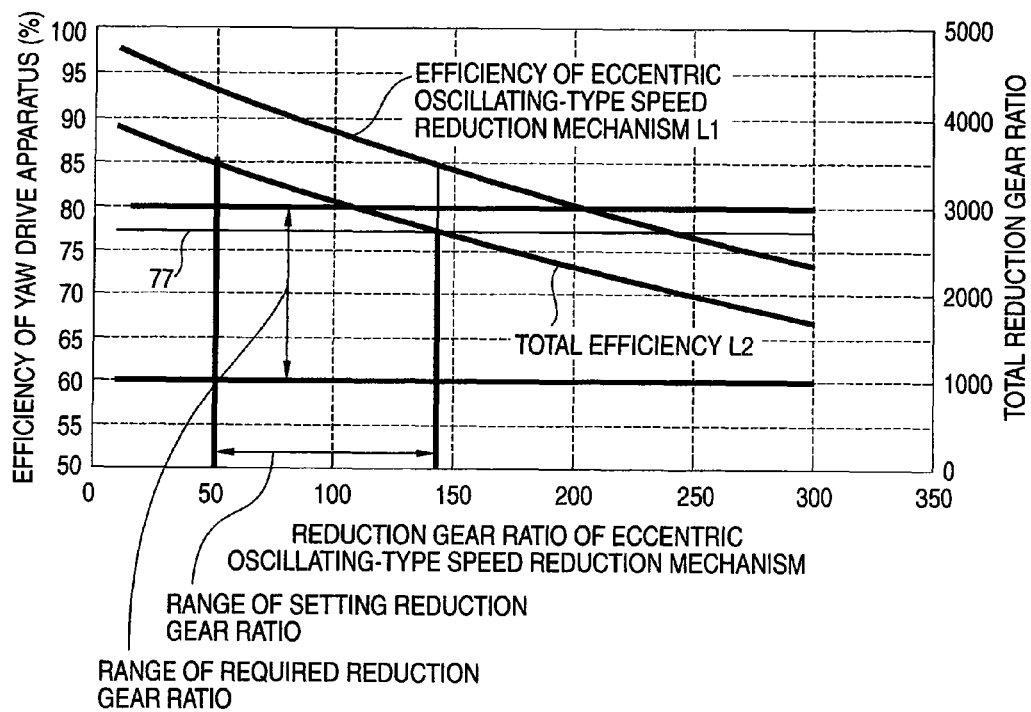
FIG. 4 is a graph illustrating a relationship among a reduction gear ratio of an eccentric oscillating type speed reduction mechanism, an efficiency of the eccentric oscillating type speed reduction mechanism, a total efficiency of a speed reducer for a yaw drive apparatus, and a total reduction gear ratio.

FIG. 4 is a graph illustrating the relationship among the reduction gear ratio of the eccentric oscillating type speed reduction mechanism, the efficiency of the eccentric oscillating type speed reduction mechanism, the total efficiency of the speed reducer for the yaw drive apparatus, and the total reduction gear ratio. In FIG. 4, the efficiency of the eccentric oscillating type speed reduction mechanism is indicated by a line L1 and decreases as the reduction gear ratio increases. The total efficiency of the yaw drive apparatus is indicated by a line L2 and decreases as the reduction gear ratio increases.

In order to maintain the total efficiency of the yaw drive apparatus of 77%, it needs to set the reduction gear ratio of the third stage speed reducing portion 30 constructed by the eccentric oscillating type speed reduction mechanism at 1/140 or less at which the total efficiency thereof is 85% or more. The ratio of 1/50 which is the minimum reduction gear ratio of the third stage reducing portion 30 is determined from the total reduction gear ratio of the first stage speed reducing portion 10 and the second speed reducing portion 20 (60/3000=1/50).

In this way, even though the speed reducer is constituted by the three stage speed reducing portions having a short axial length, when the third speed reducing portion is constructed by the eccentric oscillating type speed reduction mechanism and the reduction gear ratio is set to 1/50 to 1/140, it is possible to maintain the total efficiency of 77% required for the speed reducer for the yaw drive apparatus of the wind power generation apparatus.

When the total reduction gear ratio of the first and second speed reducing portions is set to 1/6 to 1/60, and at the same time, the reduction gear ratio of the eccentric oscillating type speed reduction mechanism is set to 1/50 to 1/140, it is easy to obtain the ratio of 1/1000 to 1/3000 which is the total reduction gear ratio of the speed reducer required for the yaw drive apparatus, even though the speed reducer is constituted by three speed reducing portions.

Further, in the first and second embodiment, the internal-geared gear bodies 32 and 82 of the eccentric oscillating speed reduction mechanisms 30 and 80 are fixed, and the output rotation is obtained from the carriers 37 and 87. However, in the speed reducer of the present invention, the carriers 37 and 87 may be fixed, and the output rotation may be obtained from the internal-geared gear bodies 32 and 82. In this case, the pinions 39 and 89 are attached to the internal-geared gear bodies 32 and 82. Further, the external teeth 38 and 88 engaged with the ring gear of the tower may be formed at the external periphery of the internal-geared gear bodies 32 and 82.

Further, in the first embodiment of the invention, the first speed reducing portion is constructed by the planetary speed reduction mechanism, and the second speed reducing portion is constructed by the spur gear type speed reduction mechanism, and in the second embodiment, the first and second speed reducing portions are constructed by the spur gear type speed reduction mechanism. However, both of the first and second speed reducing portions may be constructed by the planetary speed reduction mechanism.

Example 3

Next, a third embodiment related to the yaw drive method and apparatus using the above-described speed reducer will be described with reference to the attached drawings.

Here, an inner race of the bearing 114 is fixed to the tower. However, a plurality of inner teeth 118 is formed at the inner periphery of the inner race, so that the inner race forms a ring-shaped inner gear 119 as a first gear attached to any one of the tower 111 and the wind power generation unit 113 (in the third embodiment, to the upper end of the tower 111). In this way, when the inner race is commonly used to the inner gear 119, the entire structure of the apparatus becomes simple, whereby the apparatus can be reduced in size.

Figure 5:
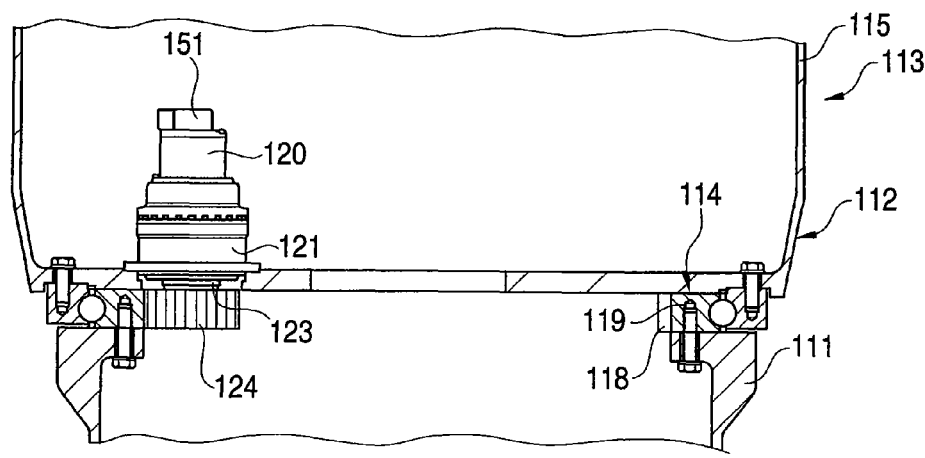
FIG. 5 is a front cross-sectional view illustrating a third embodiment of the invention.
Figure 6:
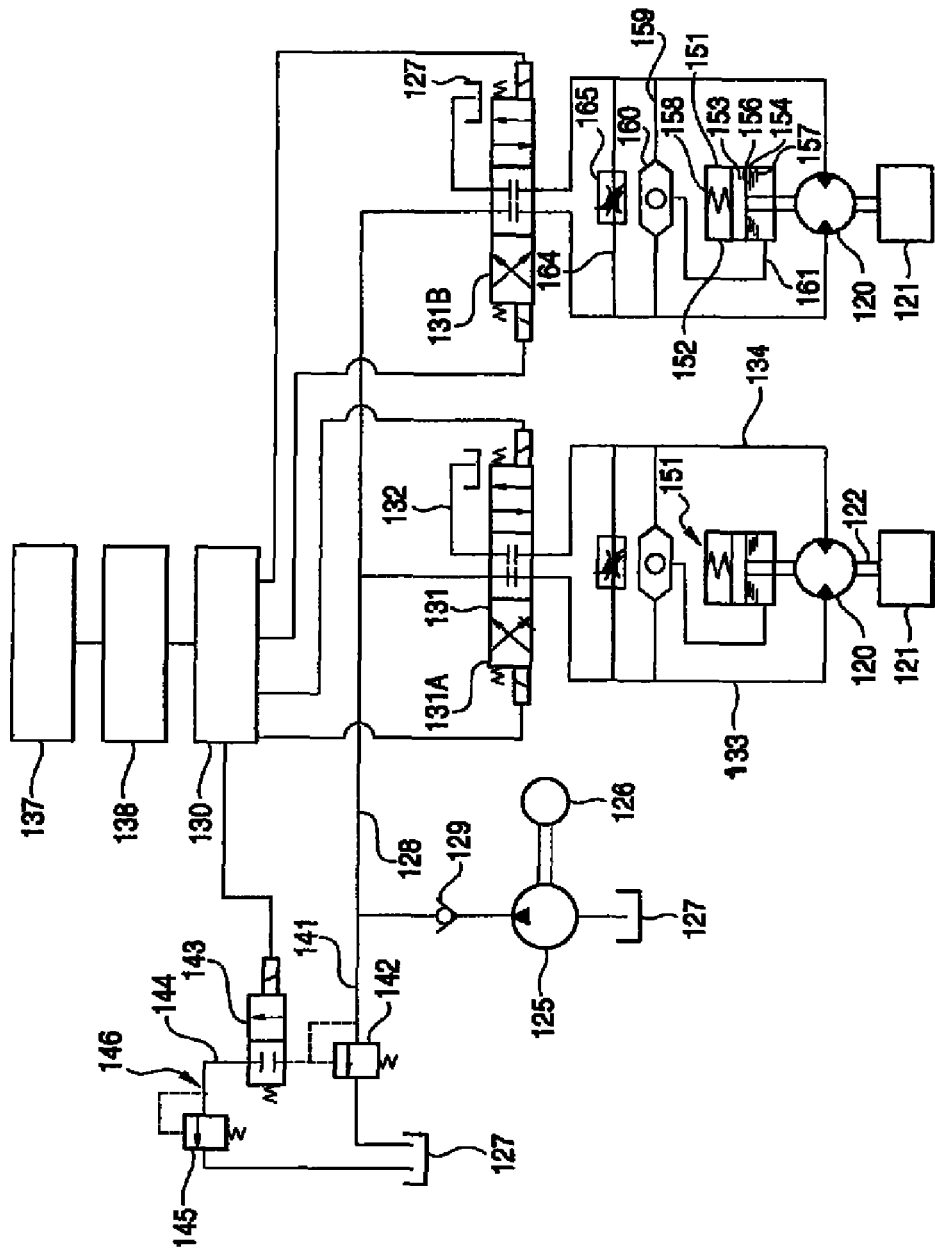
FIG. 6 is a schematic circuit diagram of the third embodiment of the invention.

A reference numeral 120 indicates fluid motors as a plurality of drive motors attached to the other side between the tower 111 and the wind power generation unit 113 (in the third embodiment, to the nacelle housing 115 of the wind power generation unit 113) with the speed reducer 121 being interposed therebetween. These fluid motors 120 are disposed with the same interval in the peripheral direction. The fluid motor 120 (here, it is constituted by the drive motor) is provided with drive energy, such that when high-pressured fluid is supplied, an output shaft 122 rotates. However, a rotational drive torque of the output shaft 122 is reduced by a speed reducer 121 and is applied to a pinion 124 which is an external gear as a second gear fixed to a rotational shaft 123 of the speed reducer 121 to rotate the pinions 124. The pinions 124 are enclosed by the tower 112 and the wind power generation unit 113 (see FIG. 5) and are engaged with the inner teeth 118 of the inner gear 119. As a result, when the pinions 124 rotate as described above, the wind power generation unit 113 yaws, supported at the tower through the bearing 114.

A reference numeral 120 indicates fluid motors as a plurality of drive motors attached to the other side between the tower 111 and the wind power generation unit 113 (in the third embodiment, to the nacelle housing 115 of the wind power generation unit 113) with the speed reducer 121 being interposed therebetween. These fluid motors 120 are disposed with the same interval in the peripheral direction. The fluid motor 120 (here, it is constituted by the drive motor) is provided with drive energy, such that when high-pressured fluid is supplied, an output shaft 122 rotates. However, a rotational drive torque of the output shaft 122 is reduced by a speed reducer 121 and is applied to a pinion 124 which is an external gear as a second gear fixed to a rotational shaft 123 of the speed reducer 121 to rotate the pinions 124. The pinions 124 are engaged with the inner teeth 118 of the inner gear 119. As a result, when the pinions 124 rotate as described above, the wind power generation unit 113 yaws, supported at the tower through the bearing 114.

A reference numeral 125 indicates a fluid pump which is rotated by a motor 126 and discharges the fluid inhaled from a tank 127 into a supply passage 128 as highly-pressured fluid. A check valve 129 is interposed in the supply passage 128. A plurality of (here, the same number as that of the fluid motor 120) solenoid type switching valves 131 controlled by a controller 130 constituted by a CPU or the like is connected to the distal end of the check valve 129. Further, the switching valves 131 and the tank 127 are connected to each other through a discharge passage 132. Reference numerals 133 and 134 indicate a pair of supply/discharge passages which connect between the paired fluid motor 120 and the switching valve 131. The supply/discharge passages 133 and 134 are switched into a flow position (a parallel-flow position or a cross-flow position), so that the one side becomes a high pressure side and the other side becomes a low pressure side, whereby the fluid motor 120 positively rotates or inversely rotates.

Since the anemoscope 137 and a potentiometer 138 are connected to the controller 130, a wind direction signal from the anemoscope 137 which indicates the present wind direction is input to the controller 130. However, at this time, when the present wind direction and the rotational direction of the wind power generation unit 113 are different, the controller 130 switches the switching valve 131 to rotate positively or inversely the fluid motor 120, and yaws the wind power generation unit 113 by following the wind direction such that the wind power generation unit 113 receives the wind from the front side and generates with high efficiency.

A reference numeral 141 indicates a relief passage connecting the supply passage 128 and the tank 127. A relief valve 142 for relieving pressure higher than the common line fluid pressure circuit is interposed in the relief passage 141. The relief valve 142 protects the fluid circuit from an abnormal high pressure. A reference numeral 143 indicates a solenoid type on-off valve connected to a pilot passage of the relief valve 142. The on-off operation of the on-off valve 143 is controlled by the controller 130. A reference numeral 144 indicates a reduction passage connecting the on-off valve 143 and the tank 27. A low pressure relief valve 145, of which relief pressure is set to a pressure lower than that of the highly-pressured fluid (a common line pressure) which is supplied to the fluid motor 120 in common yawing of the wind power generation unit 113, is interposed in the reduction passage 144.

When the on-off valve 143 is switched into on-state (open-state) by the controller 130, the low pressure relief valve 145 relieves the fluid to the tank 127 and reduces the pressure of the highly-pressured fluid supplied to the fluid motor 120 into a pressure lower than the common pressure. The above-described on-off valve 143, the reduction passage 144, and the relief valve 145 construct a reduction means 146 as a whole which makes the fluid pressure supplied to the fluid motor 120 lower than that of the highly-pressured fluid supplied to the fluid motor 120 in the common yawing. Further, a proportional pressure control valve capable of controlling the pressure of the passing fluid proportionally to the input signal value from the controller 130 may be used as the reduction means 146, instead of the protective relief valve 142. In this case, the above-described on-off valve 143, the reduction passage 144, and the low pressure relief valve 145 are unnecessary. The proportional pressure control valve performs both the relief at the abnormal high pressure and the relief at the pressure lower than that of the line pressure.

A reference numeral 151 indicates a negative brake which uses a friction plate as a braking means capable of applying a predetermined value of braking torque to the output shaft 122 of the fluid motor 120. The negative brake 151 has a fixing casing 152 and a piston 153 is received in the fixing casing 152. Further, at least one of a rotational friction plate 156 disposed between the piston 153 and a stepped plane 154 of the fixing casing 152 and spline-connected to the outside of the output shaft 122 of the fluid motor 120, and at least one of a fixed friction plate 157 which is capable of being approached to or spaced from the rotational friction plate 155 and which is spline-connected to the inner wall of the fixing casing 152 are received into the fixing casing 152.

A reference numeral 158 indicates a spring capable of applying a biasing force to the rotational and fixed friction plates 156 and 157 through the piston 153. The spring 158 presses tightly the rotational and fixed friction plates 156 and 157 against the stepped plane to frictionally connect the rotational and fixed friction plate 156 and 157 to each other. The above-described fixing casing 152, the piston 153, the rotational and fixed friction plates 156 and 157, and the spring 158 construct the above-described negative brake 151 as a whole.

A reference numeral 159 indicates a selection passage connecting the supply/discharge passages 133 and 134 to each other. A selection valve 160, which selects and takes out the highly-pressured fluid from the highly-pressured supply passage 133 or 134, is interposed in the selection passage 159. The highly-pressured fluid taken out by the selection valve 160 is induced into the braking chamber through the selection valve 160 and a brake passage 161 in the above-described braking casing 152. At this time, the piston 153 moves away from the rotational and fixed friction plates 156 and 157 against the spring 158 by the highly-pressured fluid, whereby the rotational and fixed friction plates 156 and 157 are spaced from each other.

Here, the braking chamber of the fixing casing 152 and the tank 127 are connected to each other by a discharge passage (not shown), and the switching valve 131 is interposed in the discharge passage. When the switching valve 131 is switched into the flow position, the discharge passage is closed by the switching valve 131. As a result, as described above, the highly-pressured fluid taken out by the selection valve 160 is supplied to the braking chamber, but when the switching valve is switched into neutral position, the discharge passage communicates with the braking chamber of the fixing casing 152 and discharges the fluid from the braking chamber into the tank 127 and terminates the application of the fluid power toward the piston 153.

In this way, from the time that the switching valve 131 is switched into the neutral position and the supply of the highly-pressured fluid toward the fluid motor 120 is stopped, the fluid is discharged from the braking chamber of the fixing casing 152. As a result, the negative brake 151 brings the rotational and fixed friction plates 156 and 157 to contact each other by the biasing force by the spring 158, and applies the predetermined value of the braking torque to the fluid motor 120. On the other hand, from the time that the switching valve 131 is switched into the flow position and the supply of the highly-pressured fluid begins to start, the highly-pressured fluid taken from the highly-pressured side supply/discharge passages 133 and 134 is supplied into the braking chamber of the fixing casing 152, and piston 153 is moves away from the rotational and fixed friction plates 156 and 157 and the application of the braking torque toward the fluid motor 120 is terminated.

Here, the reduction means 146 reduces the fluid pressure with two timings by the control of the controller 130. The one reduction of the fluid pressure, however, begins to start from when the supply of the highly-pressured fluid toward the fluid motor 120 begins to start, and at the same time, the reduction of the fluid pressure is terminated after a predetermined time is passed from when the supply of the highly-pressured fluid toward the fluid motor 120 begins to start. The other reduction of the pressure begins to start from just before the supply of the highly-pressured fluid is stopped and is terminated when the supply of the highly-pressured fluid toward the fluid motor 120 is stopped. Further, the reduction in the fluid pressure by the reduction means 146 must be performed during the above-describe period, but the reduction in the fluid pressure is not interrupted. For example, the fluid pressure can be reduced from a point of time before the supply of the highly-pressured toward the fluid motor 120 starts to begin, or can be reduced after the supply of the highly-pressured fluid toward the fluid motor 120 is stopped.

In this way, since the pressure of the highly-pressured fluid supplied into the fluid motor 120 is lowered than that of the fluid from when the supply of the highly-pressured begins to start to the time of the common yawing, the rotational drive torque, which is applied from the fluid motor 120 when the rotation with respect to the pinion is started, become small corresponding to the energy of the fluid of which the pressure is reduced. As a result, an impact between the teeth of the pinion 124 and the internal teeth 118 of the internal gear 119 when the pinion 124 begins to rotate is reduced, whereby it is possible to reduce the damage on the teeth of the pinion 124 and internal gear 119 and noise, and to make the apparatus small in size at a low price. After a short predetermined time passes from this state, the rotational speed of the output shaft 122 of the fluid motor 120 increases to some degree. However, since the reduction of the fluid pressure by the reduction means 146 is terminated at this point of time, from this point of time, the fluid motor is supplied with the highly-pressured fluid having the line pressure in common yawing and the yawing of the wind power generation unit 113 is performed.

Further, as described above, for a predetermined period between the time just before the supply of the highly-pressured fluid with respect to the fluid motor 120 is stopped and the supply of the highly-pressured fluid is stopped, when the pressure of the highly-pressured fluid supplied to the fluid motor 120 at this period is lowered than the pressure in common yawing, and the rotational power applied from the fluid motor 120 to the wind power generation unit 113 is made small, the rotational speed of the wind power generation unit 113 decreases gradually due to the frictional effect or gyroscopic effect of the rotor-head or the like. When the rotational speed decrease in this way, and a predetermined value of braking torque is applied from the negative brake 151 to the fluid motor 120 when the supply of the drive energy toward the fluid motor 120 is stopped, the impact between the teeth of the pinion 124 and the internal teeth 118 of the internal gear 119 decreases, whereby it is possible to reduce the damage on the teeth of the pinion 124 and internal gear 119 and noise, and to make the apparatus small in size at a low price.

Here, when the wind power generation unit 113 is at a state in which the rotation thereof is stopped, and at the same time, the braking torque is applied to the fluid motor 120 by the negative brake 151, the wind power generation unit 113 may rotate against the braking by the negative brake 151 due to the excessive wind load applied to the wind power generation unit 113 caused by a gust or the like. In this case, the rotation of the wind power generation unit 113 is transferred to the fluid motor 120 and the negative brake 151 through the internal gear 119, the pinion 124, and the speed reducer 121, and the fluid motor 120 is rotated, whereby the pump operation of the fluid motor 120 is performed and at the same time the rotational and fixed friction plates 156 and 157 rotate with them being frictional contacted to each other. In this case, when the pressure in the supply/discharge passages 133 and 134 increases to an abnormal high pressure, the negative brake 151 may be heated and damaged due to a frictional heat.

Therefore, in the third embodiment of the present invention, the pair of supply/discharge passages 133 and 134 is connected to each other by a connection passage 164 and at the same time, a variable throttle 165 is interposed in the connection passage 164. In this way, the pump operation of the fluid motor 120 is performed, such that the fluid discharged to the supply/discharge passage 133 and 134 flow to the supply/discharge passages 133 and 134 while being squeezed by the throttle 165, whereby it is possible to prevent the pressure inside the supply/discharge passages 133 and 134 from being raised to the abnormal high pressure and to control the rotational speed of the fluid motor 120 by restricting the amount of the fluid passing through the throttle 165 within a predetermined amount.

Next, the operation of the third embodiment will be described.

Assuming that the wind power generation unit 113 receives the wind from the front side, such that the switching valve 131 is converted into the neutral position, whereby the supply of the highly-pressured fluid toward the fluid motor 120 is stopped and the yawing of the wind power generation unit 113 is stopped. At this time, since the fluid is discharged from the braking chamber of the fixing casing 152 as shown in FIG. 7(*b*), the negative brake 151 brings the rotational and fixed friction plates 156 and 157 to contact frictionally to each other by a biasing force of the spring 158, and applies a predetermined value of braking torque to the fluid motor 120.

Next, when the wind direction is changed, the anemoscope 137 detects the wind direction and outputs the wind direction signal to the controller 130. As a result, as shown in FIGS. 7(*c*) and 7(*d*), the controller 130 applies a switching valve voltage to one side coil of the switching valves 131A and 131B at time T1, and switches the switching valves 131A and 131B into the flow position, for example, the parallel-flow position. In this way, the highly-pressured fluid discharged from the fluid pump 125 is supplied to the fluid motor 120 through the supply passage 128 and the supply/discharge passage 133 to rotate the fluid motor 120, and at the same time, the fluid from the fluid motor 120 is discharged into the tank 127 through the supply/discharge passage 134 and the discharge passage 132.

Figure 7:
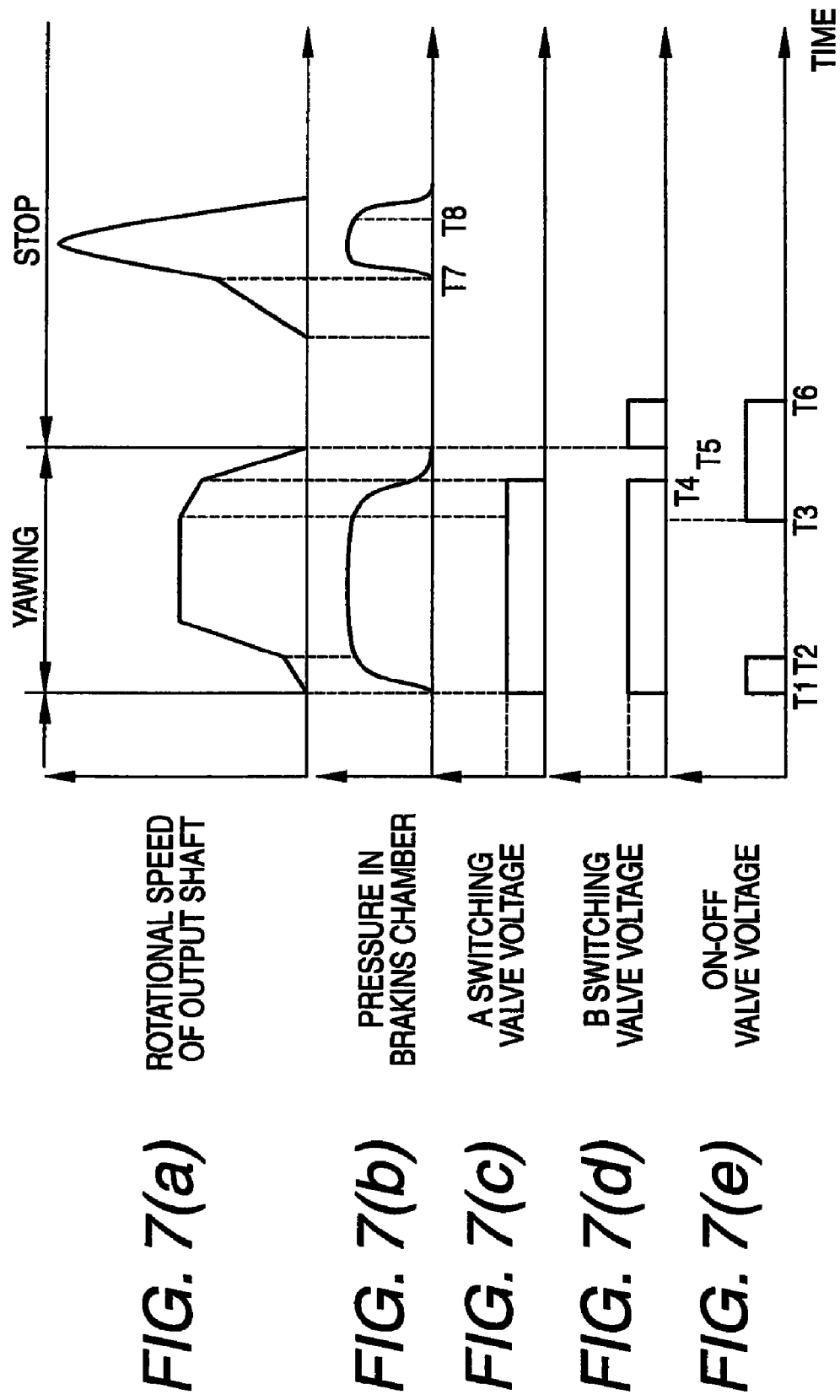
FIG. 7 is a graph illustrating an operation timing of the third embodiment of the invention, in which (a) illustrates a relationship between time and a rotational speed of an output shaft, (b) illustrates a relationship between time and a pressure in a braking chamber, (c) illustrates a relationship between time and A switching valve voltage, (d) illustrates a relationship between time and B switching valve voltage, and (e) illustrates a relationship between time and an on-off valve voltage.

In this way, when the highly-pressured fluid is supplied to the supply/discharge passage 133, the selection valve 160 selectively takes out the highly-pressured fluid from the supply and discharge valve 133, and supplies it to the braking chamber in the fixing casing 152 through the brake passage 161, raises the pressure inside the braking chamber, as shown in FIG. 7(*b*). As a result, the piston 153 receives the fluid pressure and moves away from the rotational and fixed friction plates 156 and 157 against the spring 158, and then terminates the application of the braking torque with respect to the fluid motor 120 from the time T1.

Further, at the time T1, on-off valve voltage is applied to the on-off valve 143 by the controller 130 as shown in FIG. 7(*e*), and the on-off valve 143 is switched into on-state, such that the relief valve 145 relieves the fluid into a low pressure and reduces the pressure of the fluid supplied into the fluid motor 120 to a pressure lower than a common line pressure. In this way, the pressure of the highly-pressured fluid supplied to the fluid motor 120 is lowered by the reduction means 146 to a pressure lower than the pressure (line pressure) of the fluid in the common yawing, from the point of time T1 that the supply of the highly-pressured fluid begins to start. Therefore, the rotational drive torque applied to the pinion 124 from the fluid motor 120 at the time of the start-up of the rotation become small corresponding to the energy of the fluid of which the pressure is reduced. As a result, an impact between the teeth of the pinion 124 and the internal teeth 118 of the internal gear 119 when the pinion 124 begins to rotate is reduced.

As described above, when the lowly-pressured fluid is supplied to the fluid motor 120, the rotational speed of the output shaft 122 of the fluid motor 120 is gradually raised as shown in FIG. 7(*a*), but after a predetermined short time from the time T1, at which the switching valve 131 is switched into the flow position, and reaches time T2, the rotational speed of the output shaft 122 is raised to some degree. At this time, as shown in FIG. 7(e), since the on-off valve 143 is switched into off-state (closed state) by the controller 130, the fluid is not relieved from the low pressure relief valve 145, and the pressure of the fluid supplied to the fluid motor 120 is returned to the pressure (line pressure) of the highly-pressured fluid supplied to the fluid motor 120 in the common yawing. As a result, the output shaft 122 of the fluid motor 120 is rapidly accelerated, such that the rotational speed thereof is to the normal rotational speed, and the wind power generation unit 113 rotates in the common yaw rotational speed to receive the wind from the front side.

The wind power generation unit 113 yaws by the point of time just before it receives the wind from the front side. At the time T3, as shown in FIG. 7(e), the on-off valve voltage is applied to the on-off valve 143 from the controller 130, such that the on-off valve 143 is switched into on-state and the low pressure relief valve 145 is relieved. In this way, the pressure of the fluid supplied to the fluid motor 120 is lowered, and the rotational drive torque of the fluid motor 120 becomes to a small value. Then, after the predetermined time from the time T3, when it reaches the point of time T4 at which the supply of the highly-pressured fluid is stopped, as shown in FIGS. 7(b) and 7(c), the application of the switching valve voltage from the controller 130 with respect to the switching valves 131A and 131B is terminated, and the switching valves is switched into the neutral position. In this way, the supply of the highly-pressured fluid with respect to the fluid motor 120 is stopped.

As described above, for a predetermined short period between the time just before the time T4 that the supply of the highly-pressured fluid with respect to the fluid motor 120 is stopped and the time T4, when the pressure of the fluid supplied to the fluid motor 120 is lowered than the pressure (line pressure) of the fluid supplied to the fluid motor 120 in common yawing, and the rotational power applied from the fluid motor 120 to the wind power generation unit 113 for this period is made small, the rotational speed of the wind power generation unit 113 decreases gradually due to the frictional effect or gyroscopic effect of the rotor-head or the like.

Further, as described above, when the switching valve 131 is switched into the neutral position at the time T4, the fluid is discharged from the braking chamber of the fixing casing 152 to the tank 127. At this time, the rotational and fixed friction plates 156 and 157 frictionally contact to each other due to the biasing force of the spring 158 and the negative brake 151 applies a predetermined value of braking torque to the fluid motor 120. When the rotational speed of the wind power generation unit 113 decrease in this way, and a predetermined value of braking torque is applied from the negative brake 151 to the fluid motor 120 when the supply of the drive energy toward the fluid motor 120, the impact between the teeth of the pinion 124 and the internal teeth 118 of the internal gear 119 decreases, whereby it is possible to reduce the damage on the teeth of the pinion 124 and internal gear 119 and noise, and to make the apparatus small in size at a low price.

As described above, when the braking torque is applied to the fluid motor 120 from the negative brake 151, the rotational speed of the output shaft 122 of the fluid motor 120 decreases rapidly. Here, the on-off valve 143 may switch the switching valve 131 into the neutral position and at the same time into the off-state at time T4. However, in the third embodiment, it maintains for a predetermined time after the time T4. Then, it reaches time T4, as shown in FIG. 7(a), the output shaft 122 of the fluid motor 120 is stopped, and the yawing of the wind power generation unit 113 is also stopped. At this time, the wind power generation unit 113 receives the wind from the front side, whereby the efficiency of the power generation increases.

Further, it reaches time T5, as shown in FIG. 7(d), the switching valve voltage is applied from the controller to the other side coil of the switching valve 131 (here, the switching valve 131B), and the switching valve 131B is switched into the cross-flow position. As a result, the pressured fluid is supplied to the supply/discharge passage 134 through the switching valve 131B. However, the fluid pressure at this time is determined to be low by the low pressure relief valve 145, since the on-off valve 143 keeps the on-state from the time T3.

As described above, when the lowly-pressured fluid is supplied to the supply/discharge passage 134, the negative brake 151 releases the fluid motor 120 from the braking, such that the fluid motor 120 rotates the pinion 124 to the direction opposite to the above-described direction. However, since the value of the rotational drive torque at this time is small, the pinion 124 engaged with the internal teeth 118 of the internal gear 119 and the backlash between them is removed. In this way, it is possible to reduce more effectively the impact between the teeth of the pinion 124 and the internal teeth 118 of the internal gear 119 at the time of next start-up of the yawing of the wind power generation unit 113.

Here, the switching valve voltage applied to some switching valves 131 may be applied to one side coil contrary to the above description. In this case, the pinion 124 rotates in the direction same as that of the yawing. Further, when the switching valve voltage is applied to any one side coil of some switching valves 131, the switching valve voltage may not be applied to the remained switching valves 131 in many cases. However, the switching valve voltage may be applied to the other side coil of the remained switching valves 131. When it reaches time T6, as shown in FIGS. 7(d) and 7(e), the application to with respect to the switching valve 131B is stopped, such that the switching valve 131B is returned to the neutral position and at the same time, the application of the on-off valve voltage with respect to the on-off valve 143 is terminated, whereby the on-off valve 143 is switched into off-stage. As a result, the rotation of the output shaft 122 of the fluid motor 120 is stopped, and the rotation of the wind power generation unit 113 is stopped until the wind direction is varied next time, whereby it becomes into a standby state.

During the rotation of the wind power generation unit 113 is stopped, the wind power generation unit 113 may rotate against the braking by the negative brake 151 due to the excessive wind load applied to the wind power generation unit 113 caused by a gust or the like. At this time, the fluid motor 120 performs a pump operation, such that it sucks the fluid from one of the supply and discharge valves 133 and 134 and at the same time, it discharges the fluid to the other of the supply and discharge valves 133 and 134. At this time, since the switching valve 131 was switched into the neutral position, the pressure inside the supply/discharge passages 133 and 134 in the discharge side increases, whereby the pressure inside the braking chamber of the fixing casing 152 increases rapidly as shown in FIG. 7(b). Therefore, the braking of the negative brake 151 with respect to the fluid motor 120 is released.

Further, at this time, the fluid discharged to the supply/discharge passages 133 and 134 in the discharge side flows into the supply/discharge passages 133 and 134 in the suction side while being squeezed by the throttle 165, whereby it is possible to prevent the pressure inside the supply/discharge passages 133 and 134 from being raised to the abnormal high pressure and to prevent the output shaft 122 of the fluid motor 120 and the wind power generation unit 113 from being rotated with high speed by restricting the amount of the fluid passing the throttle 165 within a predetermined amount to control the rotational speed of the fluid motor 120. Further, since the pressure inside the supply/discharge passages 133 and 134 in the discharge side serves as a back pressure, it is possible to provide the braking to the fluid motor 120. Then, when it reaches time T8 and the rotation of the wind power generation unit 113 is stopped, the pressure of the supply/discharge passages 133 and 134 decreases, such that the pressure inside the control chamber of the fixing casing 152 is also reduced as shown in FIG. 7(b), and the negative brake 151 provides again the fluid motor 120 with the braking power.

Example 4

Figure 8:
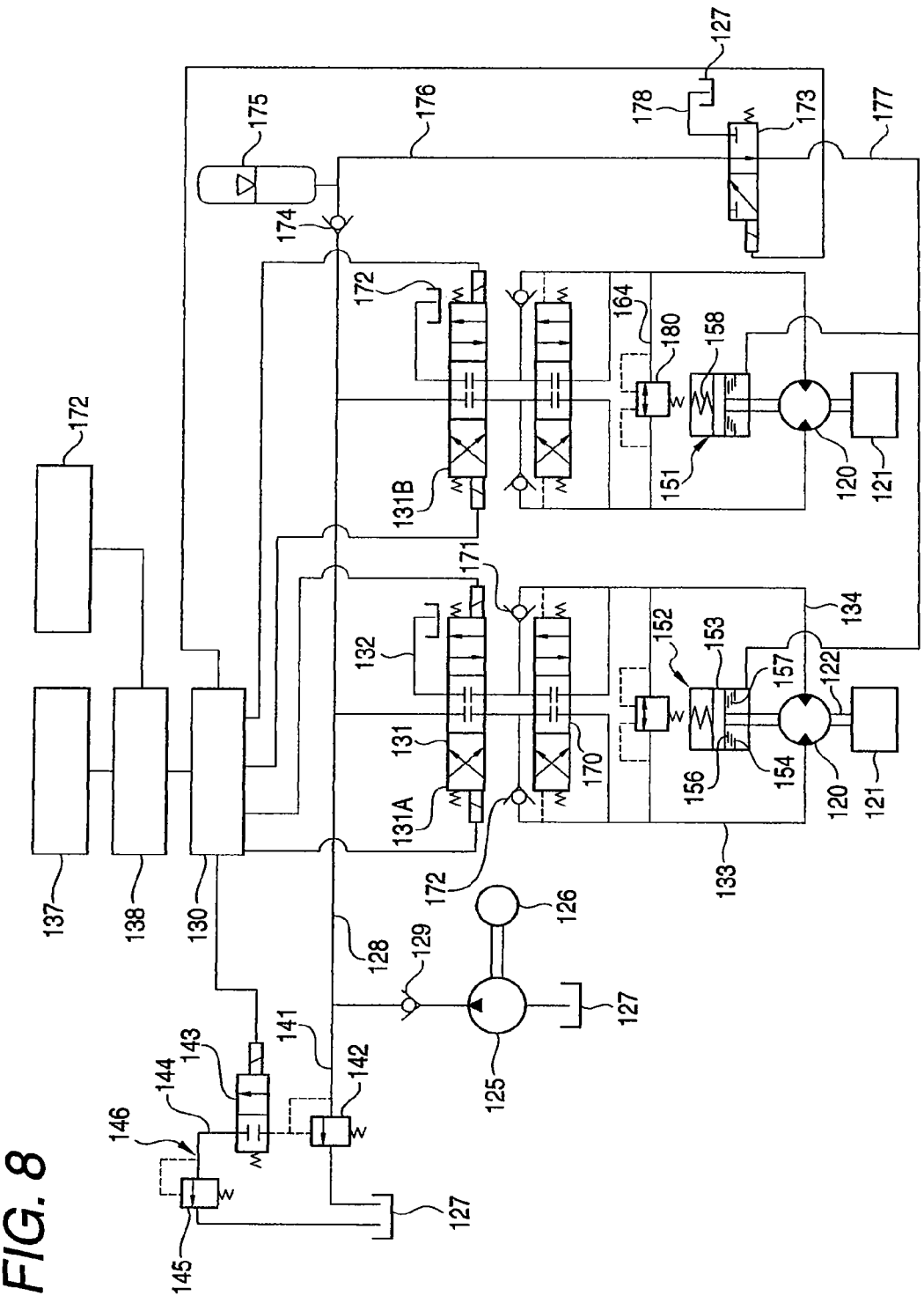
FIG. 8 is a schematic circuit diagram illustrating a fourth embodiment of the invention, which is similar to FIG. 6.

Next, a fourth embodiment of the yaw drive method and apparatus by using the speed reducer will be described with reference to FIG. 8. Here, since the structure of the fourth embodiment is substantially same as that of the third embodiment in many portions, the same portions are denoted by the same reference numerals in the drawing and descriptions for them will be omitted, and only portions different from the third embodiment will be described. In FIG. 8, a reference numeral 170 indicates a counter balance valve which is interposed in the supply/discharge passages 133 and 134 and has a check valve 171. When the wind power generation unit 113 rotates by the rotation of the fluid motor 120, if a large wind load operates in the same direction as the rotational direction of the wind power generation unit 113, the fluid motor 120 receives the wind load and performs the pump operation. At this time the counter balance valve 170 receives the pressure of the supply/discharge passages 133 and 134 in the discharge side and is switched into a state close to the off-state, thereby preventing the fluid motor 120 from being rapidly rotated.

Further, in the fourth embodiment, a control valve 173 which is switched by the control valve voltage output from the controller 130 on the basis of a wind velocity signal from an anemometer, a fluid passage 176 which connects the control valve 173 and the supply passage 128 with an accumulator 175 being interposed on the way, a supply/discharge passage 177 connecting the control valve 173 and the control chamber of the negative brake 151, and a discharge passage 178 connecting the control valve 173 and the tank 127 are provided instead of the selection passage 159, the selection valve 160, and the brake passage 161.

In this way, the anemometer measuring the wind velocity is further provided. During the rotation of the wind power generation unit 113 is stopped, when the wind velocity measured by the anemometer 172 is higher than a predetermined value, the output of the control valve voltage is stopped, such that the control valve 173 is switched into the supply position. When the highly-pressured fluid is supplied to the control chamber of the negative brake 151 from the supply passage 128, the fluid motor 120 is released from the braking caused by the negative brake 151. In this way, it is possible to prevent easily and securely a bad effect on the apparatus which is caused by a fact that the fluid motor 120 rotates while receiving the braking from the negative brake 151, when the excessive wind load caused by a gust or the like acts on the wind power generation unit 113 and the fluid motor 120 performs the pump operation. Further, since the control valve voltage is not applied at the time of a stoppage of electric current, the control valve 170 is switched into the supply position and induces the highly-pressured fluid into the negative brake 151 from the accumulator 175, thereby releasing the fluid motor 120 from the braking caused by the negative brake 151.

Further, in the fourth embodiment, instead of the throttle 165, there is provided with a relief valve 180 interposed in the connection passage 164. The relief valve 180 is switched into on-state when the pressure in any one of the supply/discharge passages 133 and 134 becomes to a predetermined pressure or more in which the predetermined pressure is higher than a line pressure and is lower than a relief pressure of the relief valve 142. In this way, during the rotation of the wind power generation unit 113 is stopped, when an excessive wind load caused by a gust acts on the wind power generation unit 113, the fluid motor 120 performs the pump operation, and the pressure in the supply/discharge passages 133 and 134 are raised to the predetermined value or more, the relief valve 180 is switched into on-state and the highly-pressured fluid in the discharge side flows toward the suction side, whereby it is possible to restrict the pressure at the discharge side to a predetermined pressure (a relief pressure). As a result, the relief pressure acts on the fluid motor 120 as a back pressure, such that the fluid braking force is applied thereto, and the rotation of the fluid motor 120 is restricted and at the same time, the torque is controlled. In this way, it is possible to omit a hydraulic pressure brake constituted by a brake disk fixed to the upper end of the tower and frictional fixing type brake shoe in which the brake disk is interposed, which is necessary to fix the conventional wind power generation unit.

Figure 9:
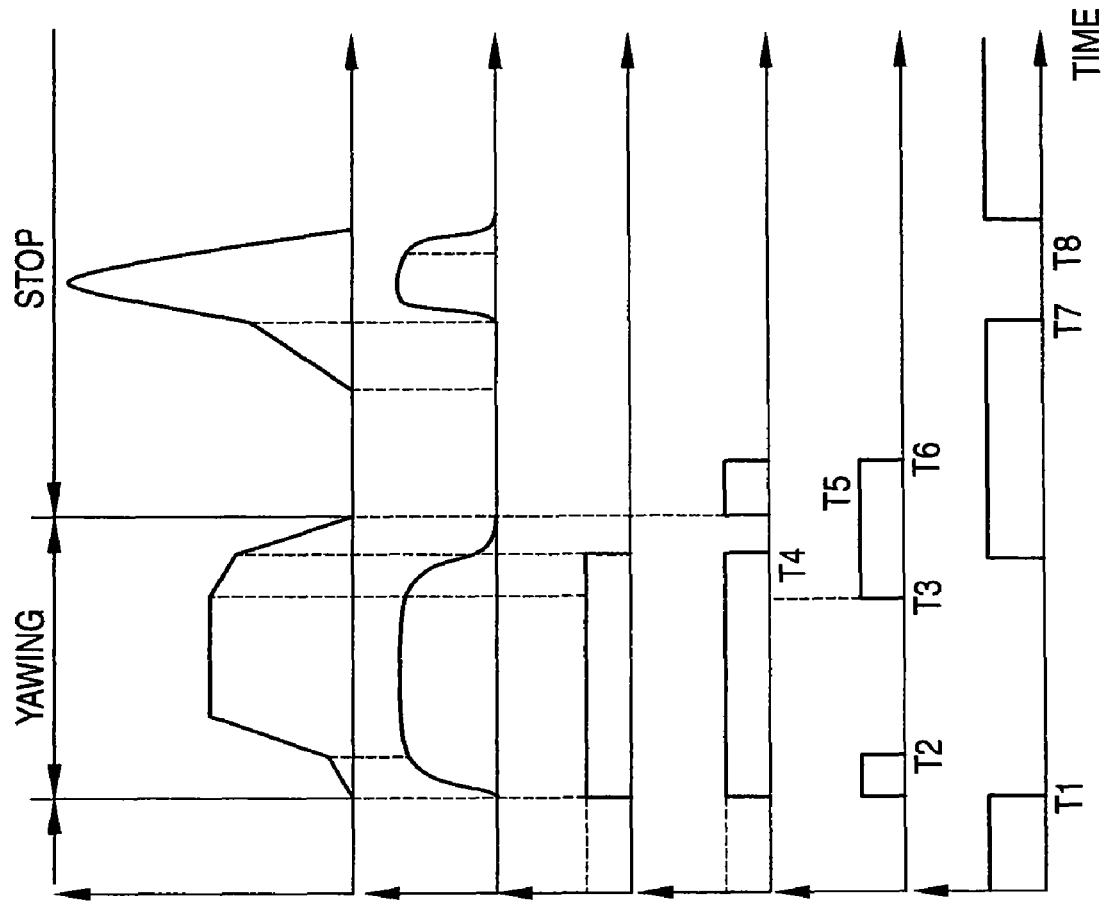
FIG. 9 is a graph illustrating an operation timing of the fourth embodiment of the invention, in which (a) illustrates the relationship between time and the rotational speed of the output shaft, (b) illustrates the relationship between time and the pressure in the braking chamber, (c) illustrates the relationship between time and the A switching valve voltage, (d) illustrates the relationship between time and the B switching valve voltage, (e) illustrates the relationship between time and the on-off valve voltage, and (f) illustrates a relationship between time and a control valve voltage.

In the fourth embodiment, during the rotation of the wind power generation unit 113, the control valve voltage is continuously applied with respect to the control valve 173. Next, when it approaches to a time T1, as shown in FIG. 9(f), the application of the control valve voltage with respect to the valve 173 from the controller 130 is stopped. As a result, the highly-pressured fluid is supplied to the control chamber of the negative brake 151 from the supply passage 128 through the fluid passage 176 and the supply/discharge passage 177, and the fluid motor 120 is released form the braking due to the negative brake 151 at the time T1. Then, since the application of the control valve voltage begins to start at a time T4, the negative brake 151 applies the braking force with respect to the fluid motor 120 from the time T4.

Further, when the wind velocity increases to a predetermined valve or more during the wind power generation unit 113 is stopped, the application of the control valve voltage to the control valve 173 from the controller 130 is stopped and the control valve 173 is switched into the supply position. In this way, the highly-pressured fluid is supplied to the control chamber of the negative brake 151 from the supply passage 128, and the fluid motor 120 is released from the braking due to the negative brake 151, thereby preventing the bad effect on the apparatus from being generated. The application of the control valve voltage is restarted at a time T8 at which the rotation of the wind power generation unit 113 is stopped. Further, another construction and operation are same as that of the third embodiment.

Example 5

Next, the fifth embodiment of the yaw drive method and apparatus by using the speed reducer will be described. In the fifth embodiment, the reduction means 146 is omitted, and the stoppage of the supply of the highly-pressured fluid with respect to the fluid motor 120 is performed by stopping the supply of the switching valve voltage to the switching valve 131 at a different timing, that is, a time T3 different from the third and fourth embodiments. At a time T4 after a predetermined short time is passed from the time T3, the application of the control valve voltage to the control valve 173 from the controller 130 begins to start to switch the control valve 173 into the discharge position, thereby applying a predetermined value of the braking torque to the fluid motor 120.

As a result, for a period between the time T3 at which the supply of the highly-pressured fluid with respect to the fluid motor 120 is stopped and a time after the passage of a predetermined time, the rotational speed of the wind power generation unit 113 gradually decreases due to the frictional effect or gyroscopic effect of the rotor-head or the like. Since the above-described braking torque is applied from the negative brake 151 to the fluid motor 120 when the rotational speed decreases in this way, the impact between the teeth of the pinion 124 and the internal teeth 118 of the internal gear 119 decreases, whereby it is possible to reduce the damage on the teeth of the pinion 124 and internal gear 119 and noise, and to make the apparatus small in size at a low price.

Further, in the above-described embodiment, the first gear (internal gear 119) is attached to the tower 111, and the fluid motor 120 is attached to the wind power generation unit 113. However, in the present invention, the first gear may be attached to the wind power generation unit and the drive motor may be attached to the tower. Further, in the above-described embodiment, the fluid motor 120 is used as the drive motor, but in the present invention, a motor may be used. In this case, the drive energy is an electric power. For the control of the supplied power, a thyristor or a tirac is preferably used. Further, in the above-described embodiment, the ring-shaped internal gear 119 is used as a first gear, and the pinion 124 which is an external gear is used as a second gear, but the external gear may be used as the first and second gears. Further, in the above-described embodiment, the fluid motors (drive motors) 120 are disposed to be spaced at equal distance in the peripheral direction. However, the drive motors may be disposed to be spaced at different distance in the peripheral direction.

Example 6

Next, a sixth embodiment of the yaw drive method and apparatus using the above-described speed reducer will be described with reference to the attached drawings.

Figure 10:
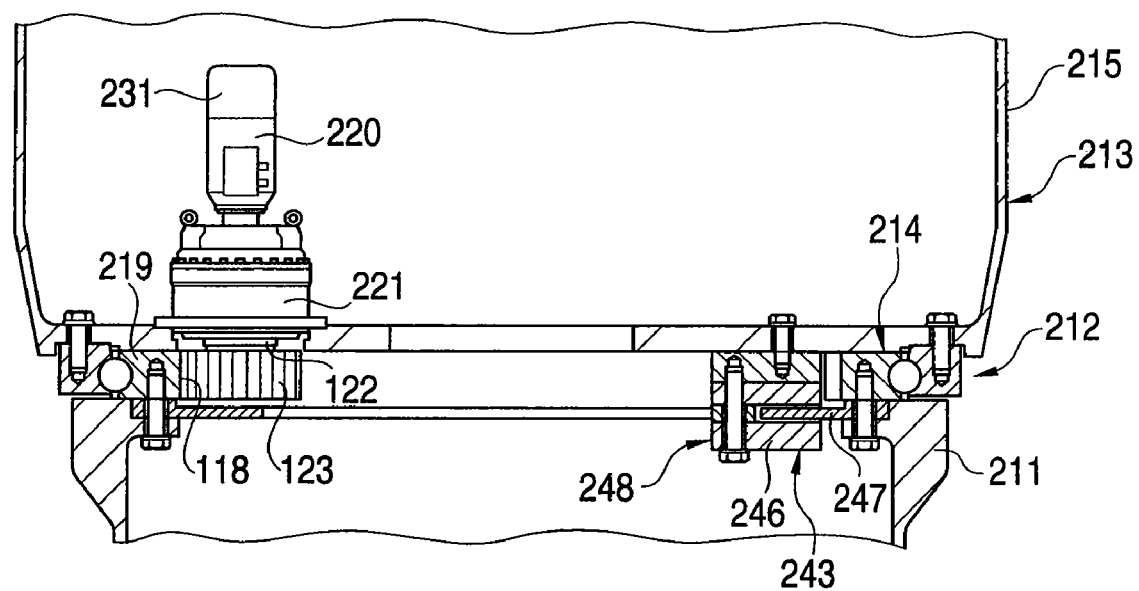
FIG. 10 is a front cross-sectional view illustrating a sixth embodiment of the invention.
Figure 11:
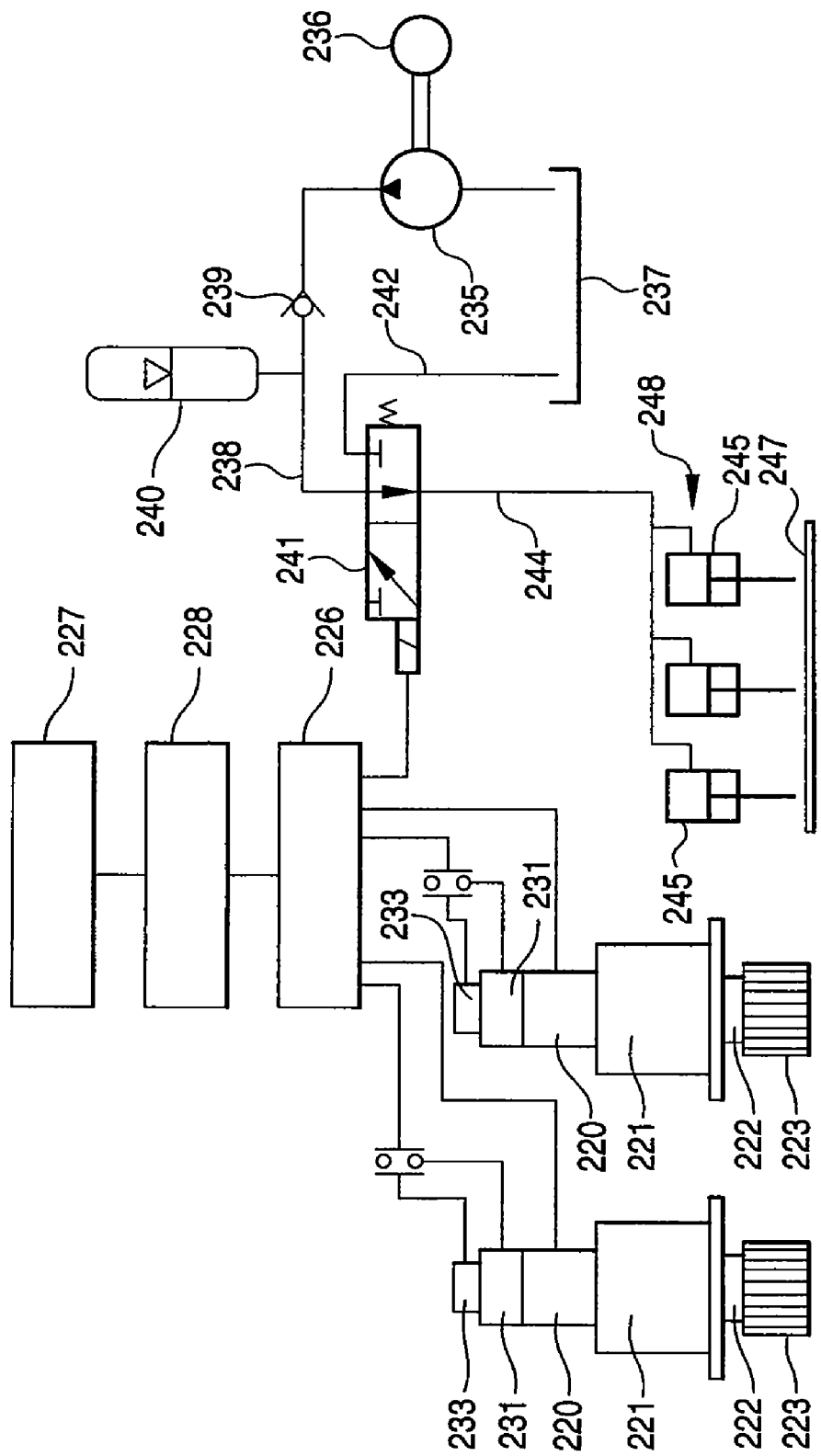
FIG. 11 is a schematic circuit diagram of the sixth embodiment of the invention.

In FIGS. 10 and 11, a reference numeral 211 indicates a tower (column) of a wind power generation apparatus 212. A wind power generation unit 213 is capable of yawing and supported at the upper end of the tower 211 through a bearing 214, that is, it is supported to rotate in a substantially horizontal plane. Here, the wind power generation unit 213 has a well-known structure and is constituted by a nacelle housing 215, a rotor head (not shown) which is supported by the nacelle housing 215 and can rotate around a substantially horizontal axis, a plurality of windmill blades (not shown) of which a radial inner end is rotatably connected to the rotor head, and an electric generator (not shown) which is fixedly received in the nacelle housing 215 and generates a power using the rotation transferred from the rotor head.

Here, an inner race of the bearing 214 is fixed at the tower 211. However, a plurality of inner teeth 218 is formed at the inner periphery of the inner race. As a result, the inner race constructs a ring-shaped inner gear 219 as a first gear attached to any one of the tower 211 and the wind power generation unit 213 (in the sixth embodiment, to the upper end of the tower 211). In this way, when the inner race is commonly used to the inner gear 219, the entire structure of the apparatus becomes simple, whereby the apparatus can be reduced in size.

A reference numeral 220 indicates motors as a plurality of drive motors attached to the other side between the tower 211 and the wind power generation unit 213 (in the sixth embodiment, to the nacelle housing 215 of the wind power generation unit 213) with the speed reducer 221 being interposed therebetween. These fluid motors 120 are disposed with the same interval in the peripheral direction. When the fluid motor 220 is provided with drive energy, here, since the drive motor is the motor, when it is provided with an electric power, an output shaft of the motor 220 rotates. However, the rotational drive torque of the output shaft is reduced by a speed reducer 221 and is applied to pinions 223 which are the external gears as second gear fixed to the rotational shaft 222 of the speed reducer 221 to rotate the pinions 224. The pinions 223 are engaged with the inner teeth 218 of the inner gear 219. As a result, when the pinions 223 rotate as described above, the wind power generation unit 213 yaws, supported at the tower through the bearing 214.

A reference numeral 226 indicates a controller such as CPU. The controller 226 is provided with a wind direction signal from an anemoscope 227 and a potentiometer 228. Further, the controller 226 operates the motor 220 on the basis of the wind direction signal indicating the present wind direction and yaws the wind power generation unit 213 following the wind direction of the wind power generation unit 213 such that the wind power generation unit 213 receives from the front side and generates an electricity with a high efficiency.

A reference numeral 231 indicates the braking means which is provided to the motor 220 and is capable of applying the braking torque of a value lower than the maximum drive torque of the motor 220. As the braking means 231, an electromagnetic brake using a well known frictional plate is used in the sixth embodiment. When the braking means 231 is electrified by the control of the controller 226, the braking means 231 applies the braking torque to the output shaft of the motor 220. On the other hand, when the electrification with respect to the braking means 231 is stopped by the control of the controller 226, the braking means 231 releases the output shaft of the motor 220 from the braking.

Here, the braking means 231 begins to start the application of the braking torque with respect to the motor by the control of the controller 226 from at least two points of time. The application of a start-up braking torque (torque for reduction) is performed from when the electrification begins to start, and the application of a final braking torque (torque for stoppage) is performed after a predetermined time from when the electrification with respect to the motor 220 is stopped. Further, the application of the start-up braking torque is terminated after a predetermined short time from when the electrification begins to start. On the other hand, the application of the final braking torque may be terminated after the rotation of the wind power generation unit 213 is terminated, but it is preferable that the braking torque is applied continuously during the time of the stoppage of the yawing without being terminated at least until the electrification to the motor 220 begins to start for preventing the wind power generation unit 213 being rotated due to the wind load or the like.

In this way, when the start-up braking torque is applied to the motor 220 by the braking means 231 for a predetermined short time from when the electrification to the motor 220 begins to start, the rotational drive torque obtained by subtracting the start-up braking torque from the output drive torque of the motor 220 is applied to the pinion 223. Here, as described above, since the start-up drive torque has a predetermined value lower than the maximum drive torque of the motor 220, the pinion 223 can rotate for yawing the wind power generation unit 213. However, since the rotational drive torque at this time has a small value obtained from the above-described subtraction, and the rotational speed of the pinion 223 is reduced by the start-up braking torque, an impact between the teeth of the pinion 2223 and the internal teeth 218 of the internal gear 219 is reduced, whereby it is possible to reduce the damage on the teeth of the pinion 223 and internal gear 219 or noise, and to make the apparatus small in size at a low price. After a short predetermined time from this state, the rotational speed of the motor 220 increases to some degree. However, at this point of time, the application of the braking torque is terminated and the yawing of the wind power generation unit is performed.

Further, as described above, when the motor 220 is applied with the final braking torque by the braking means 231, after a predetermined time from when the electrification with respect to the motor 220 is terminated, the rotational speed of the wind power generation unit 213 is reduced due to the gyroscopic effect or the frictional resistance for a period that a predetermined time has passed from when the electrification with respect to the motor 220 is terminated. The final braking torque is applied to the motor 220 from the braking means 231 when the rotational speed is reduced in this way, such that an impact between the teeth of the pinion 223 and the internal teeth 218 of the internal gear 219 is reduced, whereby it is possible to reduce the damage on the teeth of the pinion 223 and internal gear 219 or noise, and to make the apparatus small in size at a low price.

Here, the start-up braking torque and the final braking torque may be constant regardless of the passage of the time, and may be gradually decreased or increased with the passage of the time. Further, the start-up braking torque value and the final braking torque value may be equal to each other, or may be different from each other. In particular, the value of the final braking torque may be larger than that of the maximum drive torque of the motor 220.

Further, in the sixth embodiment, the application of the final braking torque is not terminated after a predetermined time, but it continues by the braking means 231 until the electrification to the motor 220 begins to start (as described above, the electrification for the start-up braking torque begins to start from this point of time), whereby the yawing of the wind power generation unit 213 when the stoppage of the motor 220 is restricted. In this way, when the same braking means 231 is provided with both the impact reduction function and the rotation restriction function of the wind power generation unit 213 at the time of the stoppage of the motor 220, the structure become simple and the manufacturing cost becomes inexpensive compared to the case in which the two braking means are provided according to their functions.

Here, when the wind power generation unit 213 is at a state in which the rotation is stopped and at the same time, the braking means 231 applies the braking torque (final braking torque) to the motor 220, the wind power generation unit 213 may rotate against the braking by the braking means 231 due to the excessive wind load applied to the wind power generation unit 213 caused by a gust or the like. In this case, the rotation of the wind power generation unit 213 is transferred to the braking means 231 through the internal gear 219, the pinion 223, and the speed reducer 221, and the output shaft of the motor 220, and the rotation is performed with the frictional plate being frictional contacted to each other. In this case, the braking means 231 may be heated and damaged due to a frictional heat.

Therefore, in this embodiment, the braking means 231 is provided with a detection sensor 233 for detecting the temperature inside the braking means 231, such that the temperature inside the braking means 231 is always detected and the detection signal is output to the controller 226. As a result, when the temperature inside the braking means 231 due to the frictional heat is raised to a permitted limit or more, the controller 226 terminates the application of the braking torque to the motor 220 of the braking means 231 on the basis of the abnormal signal from the detection sensor 233, thereby preventing previously the accident such as the above-described damage.

A reference numeral 235 indicates a fluid pump which is rotated by the motor 236 and discharges the fluid sucked from a tank 237 to a supply passage 238 as a highly-pressured fluid. A check valve 239 and an accumulator 240 are interposed in the supply passage 238, and a solenoid type switching valve 241 controlled by the controller 226 is connected to the distal end of the supply passage. Further, the switching valve 241 and the tank 237 are connected by a discharge passage 242. A reference numeral 243 indicates a plurality of brake mechanisms attached to a nacelle housing of the wind power generation unit 213 and is disposed at the same interval at the peripheral direction.

Each brake mechanism 243 is constituted by a fluid cylinder 245 connected to the switching valve 241 through the supply/discharge passage 244 and a frictionally fixed type brake shoe 246. A reference numeral 247 indicates a ring-shaped brake disk fixed to the upper end of the tower 211. When the fluid cylinder 245 is supplied with the highly-pressured fluid, the brake disk 247 is inserted into the brake shoe 246 from both sides, such that the braking power is applied to the wind power generation unit 213, thereby preventing the wind power generation unit 213 from being yawed little by little in a meaningless manner. The above-described fluid pump 235, the motor 236, the switching valve 241, the brake mechanism 243, and the brake disk 247 construct a fluid brake 248 as a whole.

Next, the operation of the sixth embodiment will be described.

Figure 12:
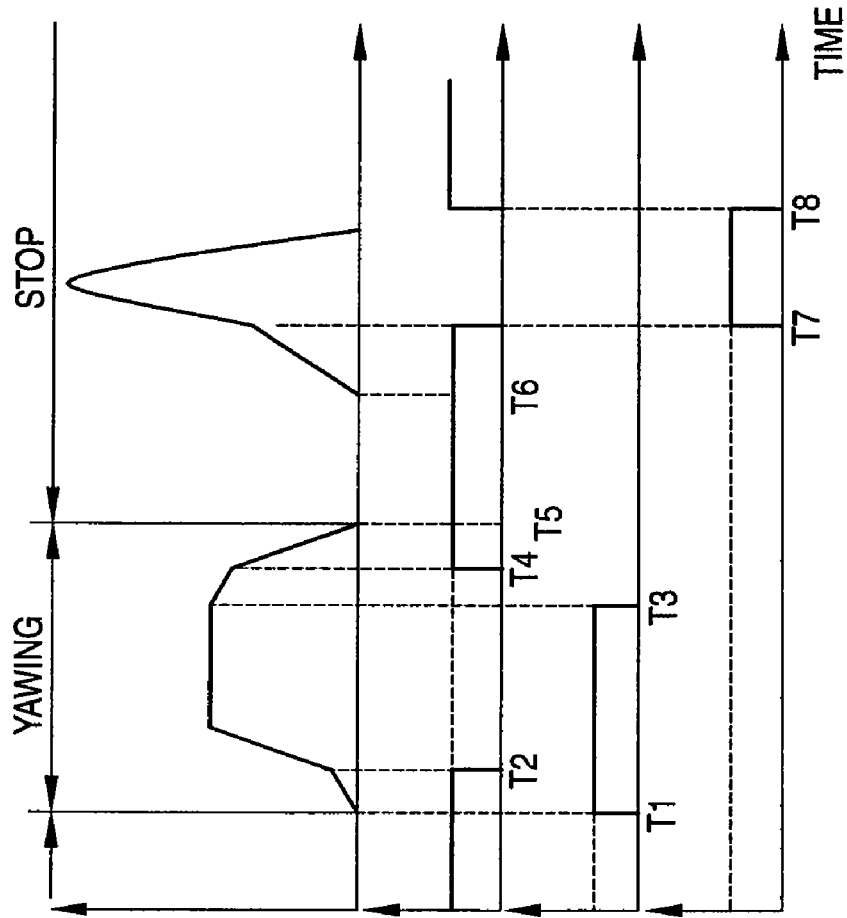
FIG. 12 is a graph illustrating an operation timing of the sixth embodiment of the invention, in which (a) illustrates the relationship between time and the rotational speed of the output shaft, (b) illustrates a relationship between time and a breaking voltage, (c) illustrates a relationship between time and a motor voltage, (d) illustrates a relationship between time and a sensor signal.

Assuming that the wind power generation unit 213 receives the wind from the front side, such that the electrification to the motor 220 is stopped, and the yawing of the wind power generation unit 213 is stopped. At this time, as shown in FIG. 12(b), the controller 226 electrifies the braking means 231 with a predetermined voltage, and applies the braking torque with respect to the output shaft of the motor 220. On the other hand, in the fluid brake 248, the switching valve 241 is switched into the supply position by the controller, and the highly-pressured fluid discharged from the fluid pump 235 is supplied to the fluid cylinder 245, such that the brake disk is inserted into the brake shoe 246 to provide the fluid braking power to the wind power generation unit 213.

Next, when the wind direction is changed, the anemoscope 227 detects the wind direction and outputs the change to the controller 226. As a result, as shown in FIG. 12(c), the controller 226 initiates the electrification with a predetermined voltage to the motor 220 at a time T1, and drives the motor 220 to rotate. Further, it reach the time T1, the switching valve 241 is switched into the discharge position by the controller 226, such that the fluid is discharged into the tank 237 from the fluid cylinder 245, whereby the wind power generation unit 213 is released from the braking of the fluid brake 248. On the other hand, the braking means 231 applies the start-up braking torque to the motor 220 from when the electrification to the motor 220 begins to start. However, as described above, since the braking means 231 continuously applies the braking torque during the rotation of the motor 220 is stopped, the electrification to the braking means 231 is actually performed continuously around the point of time, and the application of the braking torque to the motor 220 is performed continuously. In this way, when the start-up braking torque is applied to the motor from the braking means 231 after the electrification to the motor 220 begins to start, the rotational drive torque obtained by subtracting the start-up braking torque from the output drive torque of the motor 220 is applied to the pinion 223, whereby the impact between the internal teeth of the internal gear 219 and the teeth of the pinion 223 is reduced.

In this way, when the electrification to the motor 220 begins to start, the rotational speed of the output shaft of the motor 220 gradually increases as shown in FIG. 12(a). However, when a short time passes from the point of time T1 at which the electrification begins to start and it reaches the time T2, and the rotational speed of the output shaft is raised to some degree, as shown in FIG. 12(b), the electrification to the braking means 231 is stopped, and the braking means 231 releases the output shaft of the motor 220 from the braking. As a result, the output shaft of the motor 220 is rapidly accelerated, such that the rotational speed is raised to a normal rotational speed, and the wind power generation unit 213 rotates at a normal yawing speed to receive the wind from the front side. Further, when the wind power generation unit 213 yaws to the position just before it receives the wind from the front side, the electrification to the motor 220 is stopped as shown in FIG. 12(c). This point of time is T3.

When a predetermined short time passes from the point of time T3 that the electrification is stopped, and it reaches the time T4, as shown in FIG. 12(b), the electrification to the braking means 231 begins to start, and the application of the final braking torque to the output of the motor 220 begins to start. Here, since a predetermined short time is passed between the stoppage of the electrification to the motor 220 and the application of the final braking torque by the braking means 231, the rotational speed of the wind power generation unit 213 decreases due to the gyroscopic effect or the frictional effect of the rotor-head or the like. Further, since the final braking torque is applied to the motor 220 from the braking means 231 when the rotational speed decreases, the impact between the teeth of the pinion and the internal teeth of the internal bear 219.

As described above, when the final braking torque is applied to the motor from the braking means 231, the rotational speed of the output shaft of the motor decreases rapidly as shown in FIG. 12(a), and when it reaches a time T5, the rotation thereof is stopped, such that the yawing of the wind power generation unit 213 is also stopped. At this time, the wind power generation unit 213 receives the wind from the front side, such that the efficiency of the generation of the electricity increases mostly. Further, at this time, the switching valve 241 is switched into the supply position by the controller 226, such that the highly-pressured fluid discharged from the fluid pump 235 is supplied to the fluid cylinder 245. The brake disk 247 is interposed by the brake mechanism 243, and the wind power generation unit 213 is provided with the fluid braking power in addition to the braking power of the braking means 231.

The wind power generation unit 213 does not rotate from this state in which the wind direction changes next time. However, the wind power generation unit 213 may rotate against the braking by the braking means 231 and the fluid brake 248 due to the excessive wind load applied to the wind power generation unit 213 caused by a gust or the like. In this case, the rotation of the wind power generation unit 213 is transferred to the output shaft of the motor through the internal gear 219, the pinion 223, and the speed reducer 221. As shown in FIG. 12(a), the output shaft of the motor 220 initiates a high-speed rotation by a rapid acceleration from a time T6. At this time, since it rotates with the frictional plates of the braking means 231 being frictionally contacted to each other, the frictional heat generates, whereby the braking means 231 is heated.

When the temperature inside the braking means 231 is raised to a permitted temperature or more at a time T7, the detection sensor 233, which detects always the temperature inside the braking means 231, outputs the abnormal signal to the controller 226, as shown in FIG. 12(d). As a result, the controller 226 stops the electrification to the braking means 231 to terminate the application of the braking torque to the braking means 231, and releases the motor 220 from the braking caused by the braking means 231, thereby preventing the braking means 231 from being damaged.

Then, when it reaches a time T8 and the rotation of the wind power generation unit 213 is stopped and at the same time, the temperature inside the braking means 231 decreases to a permitted temperature or less, as shown in FIG. 12(d), the abnormal signal is not output from the detection signal 233, but the controller 226 electrifies the braking means 231 at this time, as shown in FIG. 12(a), and the motor 220 is applied with the braking torque by the braking means 231.

Example 7

Figure 13:
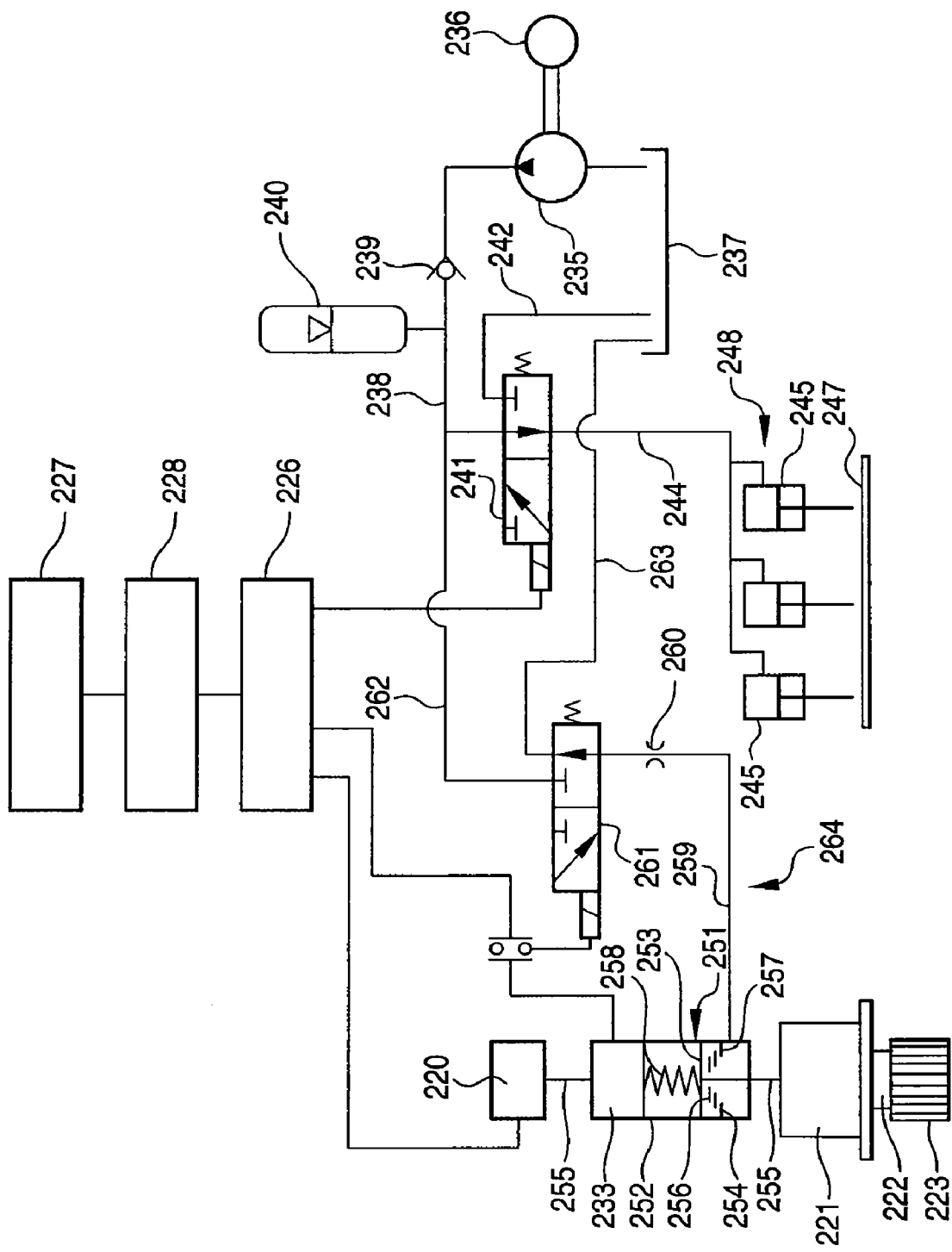
FIG. 13 is a schematic circuit diagram of a seventh embodiment of the invention, which is similar to FIG. 11.

FIG. 13 is a view illustrating a seventh embodiment of the present invention. Here, since the structure of the seventh embodiment is substantially same as that of the sixth embodiment in many portions, the same portions are denoted by the same reference numerals in the drawing and descriptions for them will be omitted, and only portions different from the sixth embodiment will be described. In FIG. 13, a reference numeral 251 indicates a braking means which is provided to the motor 220 and is capable of applying the motor 220 with a predetermined value of braking torque smaller than the maximum drive torque of the motor. Here, as the braking means 251, a fluid type negative brake using a well known frictional plate.

The braking means 251 has a fixing casing 252 in which a piston is rotatably received. Further, at least one of a rotational friction plate 256 disposed between a piston 253 and a stepped plane 254 of the braking means 251 and spline-connected to the outside of an output shaft 255 of the motor 220, as a rotational side frictional member, and at least one of a fixed friction plate 257 which is capable of being approached to or spaced from the rotational friction plate 256 and which is spline-connected to the inner wall of the fixing casing 252, as a fixed side frictional member, are received in the fixing casing 252.

A reference numeral 258 indicates a spring capable of applying a biasing force to the rotational and fixed friction plates 256 and 257 through the piston 253. The spring 258 presses tightly the rotational and fixed friction plates 256 and 257 against the stepped plane 254 to frictionally connect the rotational and fixed friction plate 256 and 257 to each other.

A reference numeral 259 indicates a fluid passage connected to the fixing casing 252, and a throttle 260 is interposed in the fluid passage. When the highly-pressured fluid is induced to the braking chamber inside the fixing casing 252 through the fluid passage 259, the piston 253 moves away from the rotational and fixed frictional plate 256 and 257 against the spring 258, whereby the rotational and fixed frictional plate 256 and 257 are separated from each other. A reference numeral 261 indicates a switching valve connected to the fluid passage 259. The other end of the supply passage 262 of which one end is connected to the supply passage 238 between the accumulator 240 and the switching valve 241, and the other end of the discharge passage 263 of which one end is connected to the tank 237 are connected to the switching valve 261. When the switching valve 261 is switched into the supply position by the controller 226, the highly-pressured fluid from the fluid pump 235 is supplied to the braking chamber of the fixing casing 252. On the other hand, when the switching valve 261 is switched into the discharge position, the fluid is discharged from the braking chamber of the fixing casing 252.

The above-described fluid passage 259 and the throttle 260 construct an isolating mechanism 264 as a whole for isolating the rotational and fixed frictional plates 256 and 2577 against the spring 258. When the isolating mechanism 264 is constructed by the fluid passage 259 and the throttle 260 as described above, it is possible to isolates securely the rotational and fixed frictional plate 256 and 257 with a simple construction. Further, the above-described fixing casing 252, the piston 253, the rotational and fixed frictional plate 256 and 257, and the isolating mechanism 264 construct the braking means 251 as a whole. In this way, when the braking means 251 is constructed by the fixed casing 252, the piston 253, the rotational and fixed frictional plate 256 and 257, and the isolating mechanism 264, it is possible to make the braking means 251 inexpensive with a simple construction.

In the seventh embodiment, as shown in FIG. 14(d), at a time T1, the electrification with a predetermined voltage to the motor 220 begins to start. On the other hand, the application of the valve switching voltage to the switching valve 261 begins to start as shown in FIG. 14(c), and the switching valve 261 is switched into the supply position. As a result, the highly-pressured fluid from the fluid pump 235 is supplied to the control chamber inside the fixing casing 252 through the supply passages 238 and 262, and the fluid passage 259, and the pressure inside the control chamber is raised as shown in FIG. 14(b). At this time, since the throttle 260 is interposed in the fluid passage 259, an amount of fluid by unit time which is supplied to the control chamber of the fixing casing 252 is restricted to a small amount.

In this way, the piston 253 moves against the spring 258 at a low speed, and a predetermined time is required for the rotational and fixed frictional plates 256 and 257 to be isolated from each other. Therefore, the rotational and fixed frictional plates 256 and 257 of the braking means 251 maintain the frictional contact state (same as the state before the time T1) by the biasing force of the spring 258 for a predetermined time from the time T1, and apply the start-up braking torque same as that in the description with respect to the motor 220. In this way, since the start-up braking torque applied to the motor 220 from the braking means 251 even after the electrification to the motor 220 begins to start, the impact is reduced similar to the sixth embodiment.

Next, it reaches to a time T3, the electrification to the motor 220 is stopped as shown in FIG. 14(d), and at the same time, the application of the valve switching voltage to the switching valve 261 is terminated as shown in FIG. 14(c), and the switching valve 261 is switched into the discharge position. As a result, due to the biasing force of the spring 258, the fluid is discharged from the control chamber of the fixed casing 252 to the tank 237 through the supply passages 238 and 262, and the fluid passage 259, and the pressure inside the control chamber decreases as shown in FIG. 14(b). At this time, since the throttle is interposed in the fluid passage 259, the amount of the fluid per unit time, which is discharged from the control chamber of the fixing casing 252, is restricted to a small amount.

In this way, the piston 253 moves at a low speed, and a predetermined time is required for the rotational and fixed frictional plates 256 and 257 to be frictionally contacted to each other. In this way, since the final braking torque is applied for the first time to the motor 220 from the braking means 251 after a predetermined short time passes since the electrification to the motor 220 has been stopped, the rotational speed of the wind power generation unit 213 decreases, whereby the impact is reduced similar to the sixth embodiment.

Further, during the rotation of the wind power generation unit 113 is stopped, the excessive wind load caused by a gust or the like may be applied to the wind power generation unit 213. Due to this, the wind power generation unit 213 rotates and at the same time the output shaft 255 of the motor 220 rotates at a high speed, such that the rotational and fixed frictional plates 256 and 257 of the braking means 251 may generate large amount of heat. In this case, since the detection sensor 233 outputs an abnormal signal to the controller 226 at a time T7 as shown in FIG. 14(e), the controller applies the valve switching voltage to the switching valve 261 as shown in FIG. 14(d), and it switches the switching valve 261 into the supply position. As a result, the highly-pressured fluid is supplied to the braking chamber of the fixing casing 252 and the motor 220 is released from the braking caused by the braking means 251. Then, when the temperature inside the braking means 231, the braking torque is applied again to the motor 220 by the braking means 251. Further, another construction and operation is same as that of the sixth embodiment.

Example 8

Next, an eighth embodiment will be described. In the eighth embodiment, when the yawing of the wind power generation is stopped, the application of the above-described final braking torque does not performed. Alternatively, for a predetermined period from just before the point of time at the electrification with respect to the motor 220 is stopped to the point of time at which the electrification begins to start, the value of the electric power electrified to the motor 220 is made smaller than the electric power supplied to the motor 220 in the common yawing by controlling the triac, the thyristor or the like by the controller 226, whereby the rotational power applied to the motor 220 for the period is made small. In this way, the rotational speed of the wind power generation unit 213 gradually decreases due to the frictional effect or gyroscopic effect of the rotor-head or the like. When the rotational speed decreases in this way, and a predetermined value of final braking torque is applied to the motor 220 after the electrification to the motor is stopped, the impact between the teeth of the pinion 223 and the internal teeth 218 of the internal gear 219 decreases, whereby it is possible to reduce the damage on the teeth of the pinion 223 and internal gear 219 and noise, and to make the apparatus small in size at a low price.

In the above-described embodiment, the first gear (internal gear 219) is attached to the tower 211, and the motor 220 is attached to the wind power generation unit 213. However, in the present invention, the first gear may be attached to the wind power generation unit and the drive motor may be attached to the tower. Further, in the above-described embodiment, the motor 220 is used as the drive motor, but in the present invention, the fluid motor may be used. In this case, the drive energy is a highly-pressure fluid. Further, in the above-described embodiment, the start-up braking torque and the final braking torque are applied by the same braking means 231. However, in the present invention, the start-up braking torque and the final braking torque may be applied by different braking means, respectively.

Further, in the above-described embodiment, the ring-shaped internal gear 219 is used as the first gear, and the pinion 223 which is an external gear is used as a second gear, but the external gear may be used as the first and second gears. Further, in the above-described embodiment, the motors (drive motors) 220 are disposed to be spaced at equal distance in the peripheral direction. However, the drive motors may be disposed to be spaced at different distance in the peripheral direction.

Here, when the fluid motor is used instead of the motor 220 in the eighth embodiment, in the connection passage connecting the high pressure side supply/discharge passage connected to the fluid motor and the tank, a proportional pressure control valve capable of linearly controlling the pressure passing through the passage, or on-off valve and a low pressure relief valve are preferably interposed in this order. In this way, in case of the yawing of the wind power generation unit, the pressure in the high pressure side supply/discharge passage is maintained at a common high pressure by setting the proportional pressure control valve at a high pressure or switching the on-off valve into an off-state. On the other hand, in case of the predetermined period from just before the supply of the highly-pressured fluid to the fluid motor is stopped until the supply is stopped, the proportional pressure control valve may be set to a low pressure, or the on-off valve is switched into on-state, such that the fluid is relieved form the low pressure relief valve, and the pressure inside the high pressure side supply/discharge passage may be decreased compared to the common high pressure.

According to the present invention, it is possible to a speed reducer and a yaw drive apparatus for a wind power generation apparatus, in which the speed reducer has high efficiency and a short axial length, and suitable for the yaw drive apparatus. Further, it can be applied to a yaw drive apparatus which performs a generation of electricity by rotating a windmill by using a wind, and which is excellent in efficiency and is compact in size.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A yaw drive apparatus of a wind power generation apparatus comprising:
   a first gear attached to one of a tower and a wind power generation unit supported to an upper end of the tower so as to be capable of yawing,
   a second gear engaged with inner teeth of the first gear, the second gear enclosed by the tower and wind power generation unit,
   a drive motor attached to the other of the tower and the wind power generation unit for rotating the second gear when drive energy is supplied thereto, thereby yawing the wind power generation unit, and
   a reduction means for producing the drive energy, which is supplied to the drive motor for a predetermined time from when the supply of the drive energy to the drive motor begins to start, is smaller than the drive energy supplied to the drive motor in a common yawing,
   wherein when the drive motor is composed of a fluid motor, a pair of supply/discharge passages which supply and discharge the fluid to and from the fluid motor is connected to each other by a connection passage, and a throttle is interposed in the connection passage, such that the rotational speed of the fluid motor when it performs a pump operation is controlled by the throttle, the pair of supply/discharge passages connect the fluid motor and a switching valve, the supply/discharge passages being switched into a parallel-flow position or a cross-flow position so that one side becomes a high pressure side and the other side becomes a low pressure side, whereby the fluid motor positively rotates or inversely rotates.

2. A yaw drive apparatus of a wind power generation apparatus comprising:
   a first gear attached to one of a tower and a wind power generation unit supported to an upper end of the tower so as to be capable of yawing,
   a second gear engaged with inner teeth of the first gear, the second gear enclosed by the tower and wind power generation unit,
   a drive motor attached to the other of the tower and the wind power generation unit for rotating the second gear when drive energy is supplied thereto, thereby yawing the wind power generation unit, and
   a reduction means for producing the drive energy, which is supplied to the drive motor for a predetermined time from when the supply of the drive energy to the drive motor begins to start, is smaller than the drive energy supplied to the drive motor in a common yawing,
   wherein when the drive motor is composed of a fluid motor, a pair of supply/discharge passages which supply and discharge the fluid to and from the fluid motor is connected to each other by a connection passage, and a relief valve, which is switched into on-state when a pressure in one of the supply/discharge passages is raised to a value higher than a predetermined value, is interposed in the connection passage, such that the torque control of the fluid motor is performed by the relief valve when the fluid motor performs the pump operation.

3. A yaw drive apparatus of a wind power generation unit, the yaw drive apparatus comprising:
   a ring-shaped internal gear attached to one of a tower and a wind power generation unit supported to the upper end of the tower so as to be capable of yawing,
   a pinion engaged with inner teeth of the internal gear, the pinion enclosed by the tower and wind power generation unit,
   a drive motor attached the other of the tower and the wind power generation unit for rotating the pinion when drive energy is supplied thereto, thereby yawing the wind power generation unit, and
   a reduction means for producing the drive energy, which is supplied to the drive motor for a predetermined time from when the supply of the drive energy to the drive motor begins to start, is smaller than the drive energy supplied to the drive motor in a common yawing,
   wherein when the drive motor is composed of a fluid motor, a pair of supply/discharge passages which supply and discharge the fluid to and from the fluid motor is connected to each other by a connection passage, and a throttle is interposed in the connection passage, such that the rotational speed of the fluid motor when it performs a pump operation is controlled by the throttle, the pair of supply/discharge passages connect the fluid motor and a switching valve, the supply/discharge passages being switched into a parallel-flow position or a cross-flow position so that one side becomes a high pressure side and the other side becomes a low pressure side, whereby the fluid motor positively rotates or inversely rotates.

4. A yaw drive apparatus of a wind power generation unit, the yaw drive apparatus comprising:

a ring-shaped internal gear attached to one of a tower and a wind power generation unit supported to the upper end of the tower so as to be capable of yawing, a pinion engaged with inner teeth of the internal gear, the pinion enclosed by the tower and wind power generation unit, a drive motor attached the other of the tower and the wind power generation unit for rotating the pinion when drive energy is supplied thereto, thereby yawing the wind power generation unit, and a reduction means for producing the drive energy, which is supplied to the drive motor for a predetermined time from when the supply of the drive energy to the drive motor begins to start, is smaller than the drive energy supplied to the drive motor in a common yawing, wherein when the drive motor is composed of a fluid motor, a pair of supply/discharge passages which supply and discharge the fluid to and from the fluid motor is connected to each other by a connection passage, and a relief valve, which is switched into on-state when a pressure in one of the supply/discharge passages is raised to a value higher than a predetermined value, is interposed in the connection passage, such that the torque control of the fluid motor is performed by the relief valve when the fluid motor performs the pump operation.

* * * * *